(12) United States Patent
Cho et al.

(10) Patent No.: US 12,610,162 B2
(45) Date of Patent: Apr. 21, 2026

(54) IMAGE PROCESSING DEVICE AND OPERATION METHOD THEREOF

(71) Applicant: SAMSUNG ELECTRONICS CO., LTD., Suwon-si (KR)

(72) Inventors: Yongjun Cho, Suwon-si (KR); Sunyool Kang, Suwon-si (KR); Yunhwan Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 307 days.

(21) Appl. No.: 18/230,290

(22) Filed: Aug. 4, 2023

(65) Prior Publication Data

US 2024/0205566 A1    Jun. 20, 2024

(30) Foreign Application Priority Data

Dec. 20, 2022    (KR) ........................ 10-2022-0179809

(51) Int. Cl.
    *H04N 25/772*        (2023.01)
(52) U.S. Cl.
    CPC ................................. *H04N 25/772* (2023.01)
(58) Field of Classification Search
    CPC ..... H04N 25/775; H04N 25/78; H04N 25/766
    USPC ................................................... 348/207.99
    See application file for complete search history.

(56) References Cited

U.S. PATENT DOCUMENTS

| | | | |
|---|---|---|---|
| 6,930,716 B2 | 8/2005 | Yoshida | |
| 6,946,715 B2 | 9/2005 | Hong | |
| 7,224,390 B2 | 5/2007 | Kokubun et al. | |
| 7,595,830 B2 | 9/2009 | Oita et al. | |
| 7,999,870 B2 | 8/2011 | Compton et al. | |
| 8,809,759 B2 | 8/2014 | Mo et al. | |
| 9,191,599 B2 | 11/2015 | Park et al. | |
| 10,355,051 B2 | 7/2019 | Keel et al. | |
| 2018/0151626 A1* | 5/2018 | Keel ................... | H10F 39/8033 |

FOREIGN PATENT DOCUMENTS

| | | |
|---|---|---|
| JP | 4132850 B2 | 8/2008 |
| KR | 10-0812792 B1 | 3/2008 |
| KR | 10-1948057 B1 | 2/2019 |

* cited by examiner

*Primary Examiner* — Joel W Fosselman
(74) *Attorney, Agent, or Firm* — Muir Patent Law, PLLC

(57) ABSTRACT

An image sensor including a pixel array including a plurality of pixels arranged in a plurality of rows and a plurality of columns, a row driver configured to transmit control signals to the pixel array, and an analog-to-digital converter array configured to receive pixel signals from the pixel array and convert the pixel signals into a digital signal, wherein the row driver is configured to transmit a control signal such that a first pixel group arranged in a first row from among the plurality of rows and a second pixel group arranged in a second row from among the plurality of rows output pixel signals during a first period, and transmit a control signal such that a third pixel group arranged in the first row and a fourth pixel group arranged in the second row output pixel signals during a second period.

17 Claims, 14 Drawing Sheets

IMAGE PROCESSING DEVICE AND OPERATION METHOD THEREOF

CROSS-REFERENCE TO RELATED APPLICATION

Korean Patent Application No. 10-2022-0179809, filed on Dec. 20, 2022, in the Korean Intellectual Property Office, is incorporated by reference herein in its entirety.

BACKGROUND

1. Field

An image processing device and operation method thereof is disclosed.

2. Description of the Related Art

The image processing device may include an image sensor as a device for capturing a two-dimensional or three-dimensional image of an object.

SUMMARY

Embodiments are directed to an image sensor including a pixel array including a plurality of pixels arranged in a plurality of rows and a plurality of columns, a row driver configured to transmit control signals to the pixel array, and an analog-to-digital converter array configured to receive pixel signals from the pixel array and convert the pixel signals into a digital signal, wherein the row driver is configured to transmit a control signal such that a first pixel group arranged in a first row from among the plurality of rows and a second pixel group arranged in a second row from among the plurality of rows output pixel signals during a first period, and transmit a control signal such that a third pixel group arranged in the first row and a fourth pixel group arranged in the second row output pixel signals during a second period.

Embodiments are directed to an operation method of an image sensor, the method including outputting pixel signals by a first pixel group arranged in a first row from among a plurality of rows included in a pixel array of the image sensor during a first period, and a second pixel group arranged in a second row, and outputting pixel signals by a third pixel group arranged in the first row and a fourth pixel group arranged in the second row during a second period.

Embodiments are directed to an image sensor including a pixel array including a plurality of pixels arranged in a plurality of rows and a plurality of columns, a row driver configured to transmit control signals to the pixel array, and an analog-to-digital converter array configured to receive pixel signals from the pixel array and convert the pixel signals into a digital signal, wherein the row driver is configured to transmit a control signal to two pixel groups to output pixel signals of the two pixel groups of the pixel array during one readout period, and each of the two pixel groups is configured to be included in different rows at a location adjacent to the pixel array.

BRIEF DESCRIPTION OF THE DRAWINGS

Features will become apparent to those of skill in the art by describing in detail exemplary embodiments with reference to the attached drawings in which:

FIG. 2 is a block diagram showing a configuration of an image sensor according to an example embodiment.

FIG. 5 is a circuit diagram of a pixel array according to an example embodiment.

FIG. 8B is a timing diagram showing a read out of a pixel signal in a pixel array according to an example embodiment.

FIG. 9B is a diagram showing a read-out of multiple pixels of a pixel array according to an example embodiment.

DETAILED DESCRIPTION

Figure 1:
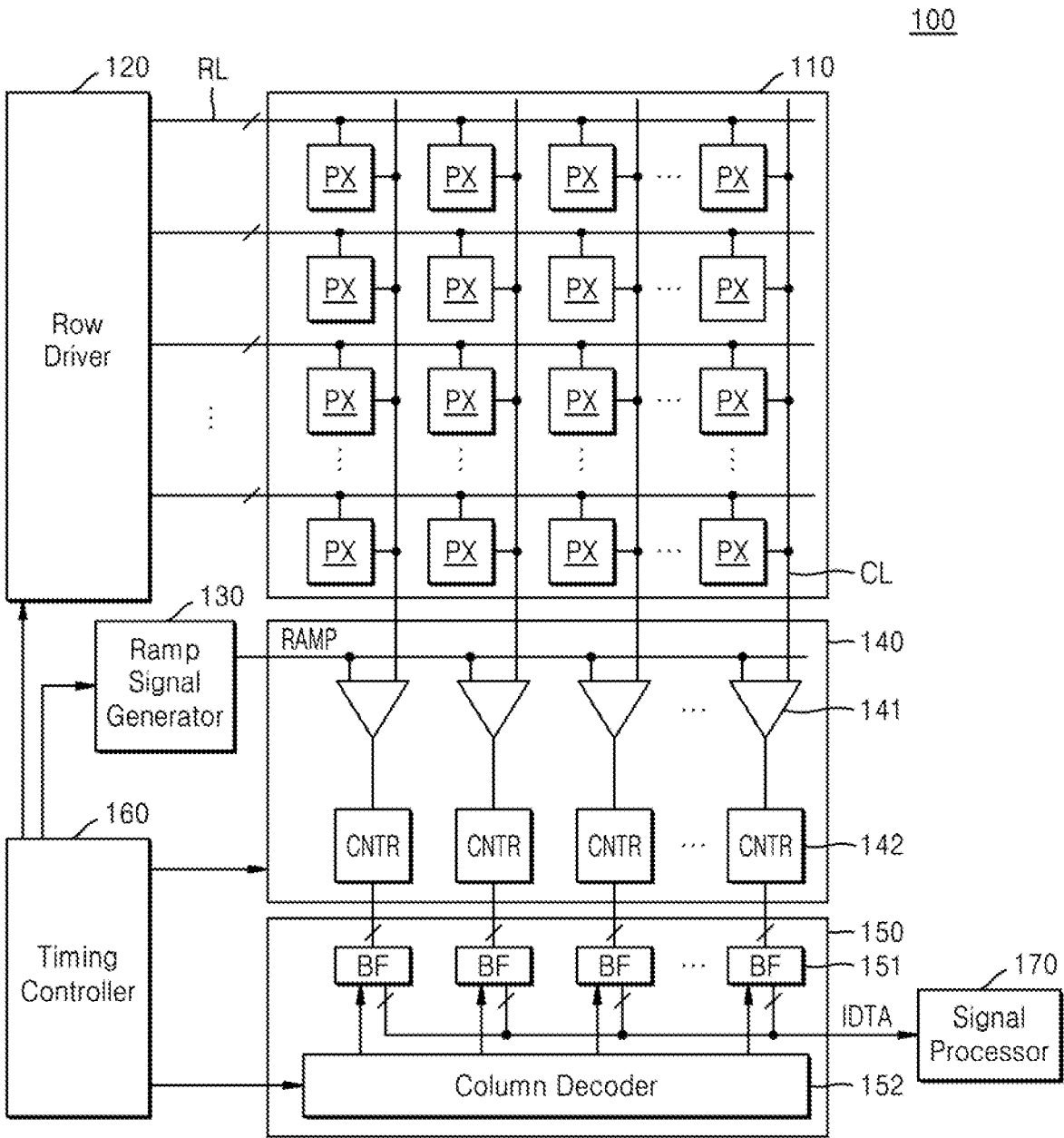
FIG. 1 is a block diagram showing an image sensor according to an example embodiment.

FIG. 1 is a block diagram showing an image sensor 100 according to an example embodiment. The image sensor 100 may be mounted on an electronic device having an image or photo sensing function. In an implementation, the image sensor 100 may be mounted on an electronic device such as a camera, a smartphone, a wearable device, an Internet of Things (IoT) device, a home appliance, a tablet personal computer (PC), a personal digital assistant (PDA), a portable multimedia player (PMP), a navigation system, a drone, or an advanced driver assistance system (ADAS). In addition, the image sensor 100 may be mounted on an electronic device provided as a component in vehicles, furniture, manufacturing facilities, doors, or various measuring devices. As used herein, the term "or" is not an exclusive term, e.g., "A or B" would include A, B, or A and B.

Referring to FIG. 1, the image sensor 100 may include a pixel array 110, a row driver 120, a ramp signal generator 130, an analog-to-digital conversion (ADC) circuit 140, a data output circuit 150, and a timing controller 160. The image sensor 100 may further include a signal processor 170 for signal processing.

The pixel array 110 includes a plurality of pixels PX connected to a plurality of row lines RL and a plurality of column lines CL and arranged in a matrix. The plurality of pixels PX may respectively be active pixel sensors (APS).

Each of the plurality of pixels PX may include at least one photoelectric conversion device, and each pixel PX may sense light using the photoelectric conversion device and output an image signal that is an electrical signal according to the sensed light. In an implementation, the photoelectric conversion device may include a photodiode, a phototransistor, a photo gate, or a pinned photodiode.

Each of a plurality of pixels PX may sense light in a specific spectrum band. In an implementation, the plurality of pixels PX may include red pixels for converting light in a red spectrum band into an electrical signal, green pixels for converting light in a green spectrum region into an electrical signal, and blue pixels for converting light in a blue spectrum region into an electrical signal. The plurality of pixels PX may further include white pixels. As another example, the plurality of pixels PX may include pixels combined with different color configurations, such as yellow pixels, cyan pixels, or green pixels.

A color filter array for transmitting light of a specific spectrum region may be above the plurality of pixels PX, and a color that may be sensed by a corresponding pixel may be determined according to a color filter above each of the plurality of pixels PX. In the case of a specific photoelectric conversion device in an embodiment, light in a specific wavelength band may be converted into an electrical signal depending on the level of the electrical signal applied to the photoelectric conversion device.

The row driver 120 may drive the pixel array 110 in row units. The row driver 120 may decode a row control signal (e.g., an address signal) received from the timing controller 160 and select at least one row line from among row lines constituting the pixel array 110 in response to the decoded row control signal. In an implementation, the row driver 120 may generate a selection signal for selecting one of a plurality of rows. In addition, the pixel array 110 may output a pixel signal, such as a pixel voltage, from a row selected by a selection signal provided from the row driver 120. The pixel signal may include a reset signal and an image signal.

The row driver 120 may transmit control signals for outputting pixel signals to the pixel array 110, and each pixel PX may output a pixel signal through a corresponding column line CL by operating in response to the control signals. In FIG. 1, pixels PX arranged in the same row may be connected to the same row line RL. In FIG. 1, pixels PX arranged in the same column may be connected to the same column line CL.

In one embodiment, the row driver 120 may transmit to the pixel array 110, control signals for outputting a pixel signal of a first pixel group arranged in a first row of the pixel array 110 and a pixel signal of a second pixel group arranged in a second row of the pixel array 110 during a first period for reading out the pixel array 110.

In addition, the row driver 120 may transmit to the pixel array 110, control signals for outputting a pixel signal of a third pixel group arranged in the first row of the pixel array 110 and a pixel signal of a fourth pixel group arranged in the second row of the pixel array 110 during a second period for reading out the pixel array 110. The first pixel group and the third pixel group may include different pixels PX, and the second pixel group and the fourth pixel group may include different pixels PX.

Accordingly, a plurality of rows (e.g., a first row and a second row) of the pixel array 110 may be read out by different viewpoints in pixels of the same row as described below with reference to FIGS. 3B, 8C, and 9B.

The ramp signal generator 130 may generate a ramp signal RAMP (e.g., ramp voltage) having a level that rises or falls at a predetermined slope under control by the timing controller 160 and provide the ramp signal RAMP to a plurality of comparators 141 provided in the ADC circuit 140.

The ADC circuit 140 may include a plurality of comparators 141 and a plurality of counter circuits 142. The ADC circuit 140 may convert a pixel signal (e.g., a pixel voltage)

input from the pixel array 110 into a pixel value that may be a digital signal. Each pixel signal received through each of the plurality of column lines CL may be converted into a pixel value which may be a digital signal by the plurality of comparators 141 and the plurality of counter circuit 142.

The plurality of comparators 141 may compare a pixel signal received through the column line CL, such as a pixel voltage, with a ramp signal RAMP, and output the comparison result as a comparison result signal.

In an implementation, the plurality of comparators 141 may output a comparison signal that transitions from a first level (e.g., logic high) to a second level (e.g., logic low) when the level of the ramp signal RAMP is the same as the level of the pixel signal. A time point at which the level of the comparison signal is shifted may be determined according to the level of the pixel signal.

The plurality of comparators 141 may respectively be a plurality of correlated double sampling (CDS) circuits. Each of the CDS circuits may sample a pixel signal provided from each of the pixels PX according to a CDS scheme. Each of the CDS circuits may sample a reset signal received as a pixel signal and compare the reset signal with the ramp signal RAMP to generate a comparison signal according to the reset signal. Each of the CDS circuits may store the reset signal. Thereafter, the CDS circuit may sample an image signal correlated with the reset signal, compare the image signal with the ramp signal RAMP, and generate a comparison signal according to the image signal.

The CDS circuit may sample and hold pixel signals provided from the pixel PX according to a CDS method, and may double-sample specific levels of noise, such as reset levels and image signal levels. Each of the CDS circuits may generate a comparison result signal corresponding to the reset level and a comparison result signal corresponding to the image signal level. Here, the image signal level may be read out after reading out the reset level, or the reset level may be read out after reading out the image signal level.

Each of the counter circuits 142 may count a level transition time point of the comparison result signal output from each of the plurality of comparators 141 and output a count value. In an embodiment, each counter circuit 142 may include a latch circuit and an operation circuit.

The data output circuit 150 may temporarily store and output the pixel value output from the ADC circuit 140. The data output circuit 150 may include a plurality of column memories 151 and a column decoder 152. Each column memory 151 stores a pixel value received from each counter circuit 142. In an embodiment, each of the plurality of column memories 151 may be provided in each of the counter circuits 142. A plurality of pixel values stored in the plurality of column memories 151 may be output as image data IDTA under control by the column decoder 152.

The timing controller 160 may control the operation or timing of the row driver 120, the ramp signal generator 130, the ADC circuit 140, and the data output circuit 150 by outputting control signals to the row driver 120, the ramp signal generator 130, the ADC circuit 140, and the data output circuit 150, respectively.

The signal processor 170 may perform various signal processes such as noise reduction processing, gain adjustment, waveform shaping processing, interpolation processing, white balance processing, gamma processing, edge emphasis processing, or binning, on image data.

In an implementation, the signal processor 170 may perform signal processing such as image quality compensation, binning, and downsizing on the received image data, and the image quality compensation may include signal processing such as black level compensation, lens shading compensation, crosstalk compensation, and bad pixel correction.

FIG. 1 illustrates a configuration in which the signal processor 170 is included in the image sensor 100, and the signal processor 170 may be provided in an external processor of the image sensor 100. In an embodiment, the signal processor 170 may generate a final digital signal based on a plurality of digital signals. An entire digital signal may include all of the plurality of digital signals. In an implementation, the signal processor 170 may perform an average operation on binary values of a plurality of digital signals and may generate an average value of the digital signals as a final digital signal.

Image data output from the signal processor 170 may be transmitted to the external processor. In an implementation, the external processor may be a host processor of an electronic device on which the image sensor 100 may be mounted.

In an implementation, the external processor may be an application processor of a mobile terminal. The image sensor 100 may transmit image data to the external processor according to a data communication method based on a set interface, such as a mobile industry processor interface (MIPI).

Figure 2:
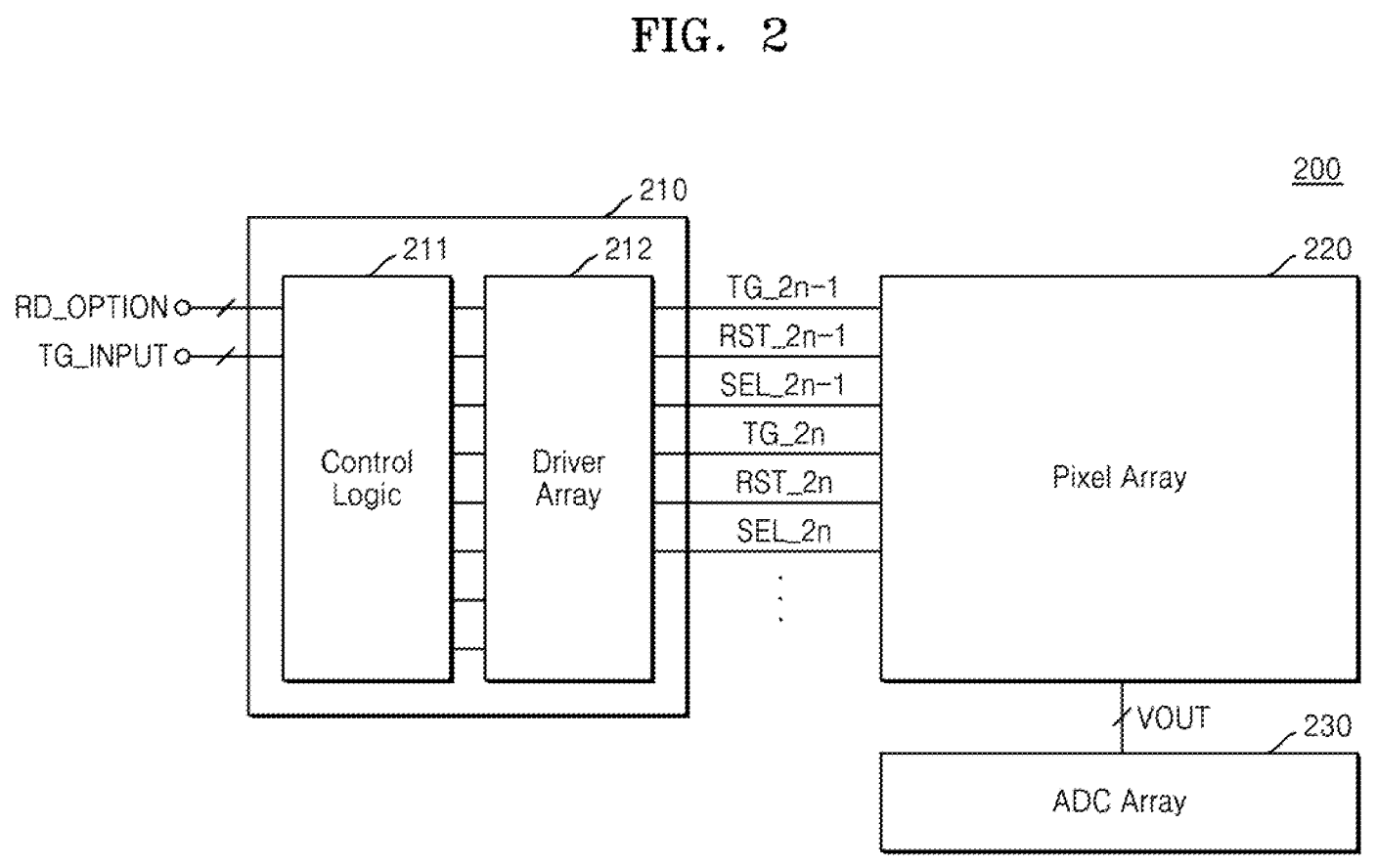

FIG. 2 is a block diagram showing a configuration of an image sensor according to an example embodiment. FIG. 2 is a block diagram for describing in detail the internal configuration of the row driver 120 of the image sensor 100 of FIG. 1. A row driver 210 of FIG. 2 may correspond to the row driver 120 of FIG. 1, a pixel array 220 of FIG. 2 may correspond to the pixel array 110 of FIG. 1, and an ADC array 230 of FIG. 2 may correspond to the ADC circuit 140 of FIG. 1.

Referring to FIG. 2, the row driver 210 may include a control logic 211 and a driver array 212 and may be electrically connected to the pixel array 220. In one embodiment, the control logic 211 of the row driver 210 may receive a control signal TG_INPUT for the pixel array 220 received from another module (e.g., a timing controller) of the image sensor and an operation signal RD_OPTION, which may be an incidental control signal for the pixel array 220.

In an implementation, the control signal TG_INPUT may include an address signal of each of the rows included in the pixel array 220, and control signals for transmission signals TG, reset signals RST, and selection signals SEL which may be respectively provided to the plurality of rows connected to the pixel array 220.

In an implementation, the operation signal RD_OPTION may include a signal (e.g., an on/off signal) that additionally indicates whether each of the rows included in the pixel array 220 is turned on according to an option selected by a user or an algorithm of the electronic device.

In an embodiment, the control logic 211 may generate a basic control signal for controlling a target row using the control signal TG_INPUT and transmit the generated control signal to the pixel array 220 through the driver array 212. The control logic 211 may control the operation of the entire pixel array 220 by sequentially applying the generated basic control signal to the remaining rows.

In an embodiment, when the operation signal RD_OPTION for the target row is an off signal, the control logic 211 may control the pixel array 220 through the driver array 212 to turn off the target row despite the control signal TG_INPUT. In other words, when the operation signal RD_OPTION for the target row is an off signal, the control logic may control the pixel array 220 through the driver array 212 to turn off the target row regardless of the data transmitted by the control signal TG_INPUT.

The driver array 212 of the row driver 210 may be a module electrically connected to the control logic 211 and the pixel array 220, and may generate the control signal corresponding to each of the rows included in the pixel array 220 to then be transmitted to the pixel array 220 by copying the basic control signal received from the control logic 211 and shifting every cycle. In this case, the number of rows included in the driver array 212 may correspond to the number of rows included in the pixel array 220.

In an implementation, when a (2n−1)th row is selected as the target row of the pixel array 220, the control logic 211 of the row driver 210 may transmit, to the driver array 212, basic control signals TG_2n−1, RST_2n−1, and SEL_2n−1 by mapping addresses for the (2n−1)th row to control information for the row, and the driver array 212 may physically generate control signals corresponding to the rows related to the (2n-1)th row from among the plurality of rows included in the pixel array 220 and transmit the control signals to the pixel array 220 by copying the received basic control signals TG_2n−1, RST_2n−1, and SEL_2n−1 and shifting the received basic control signals TG_2n−1, RST_2n−1, and SEL_2n−1 every cycle.

In an implementation, when a (2n)th row is selected as the target row of the pixel array 220, the control logic 211 of the row driver 210 may transmit, to the driver array 212, basic control signals TG_2n, RST_2n, and SEL_2n by mapping addresses for the (2n)th row to control information for the row, and the driver array 212 may physically generate control signals corresponding to the rows related to the (2n)th row from among the plurality of rows included in the pixel array 220 and transmit the control signals to the pixel array 220 by copying the received basic control signals TG_2n, RST_2n, and SEL_2n and shifting the received basic control signals TG_2n, RST_2n, and SEL_2n every cycle.

In an embodiment, the pixel array 220 may output a pixel signal VOUT for a row selected according to the received control signal, and the ADC array 230 may convert the output pixel signal VOUT into a digital signal.

Figure 3A:
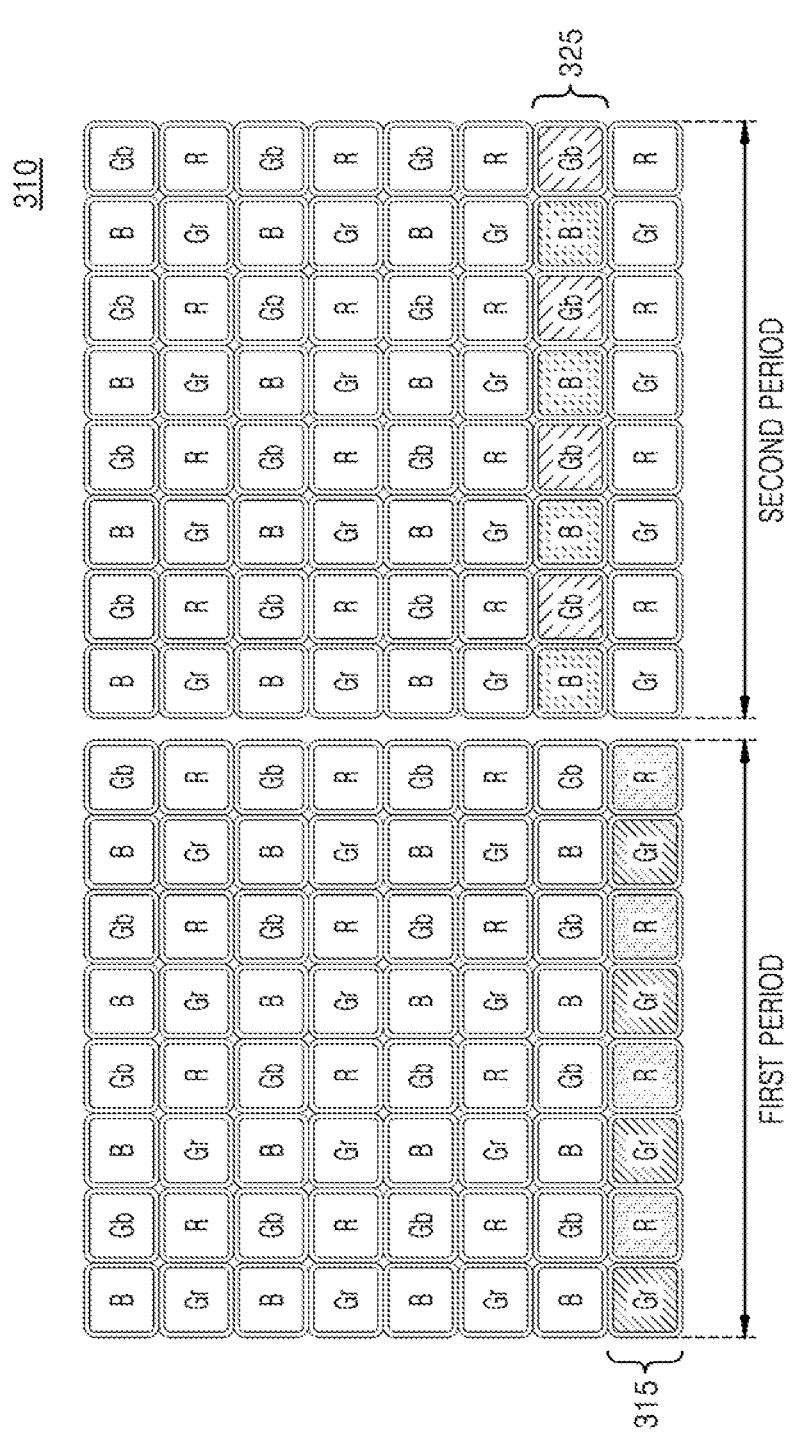
FIG. 3A is a diagram showing a read-out for rows of a pixel array according to a comparative example.

FIG. 3A is a diagram showing a read-out for rows of a pixel array according to a comparative example. FIG. 3B is a diagram showing a read-out for rows of a pixel array according to an example embodiment.

Figure 3B:
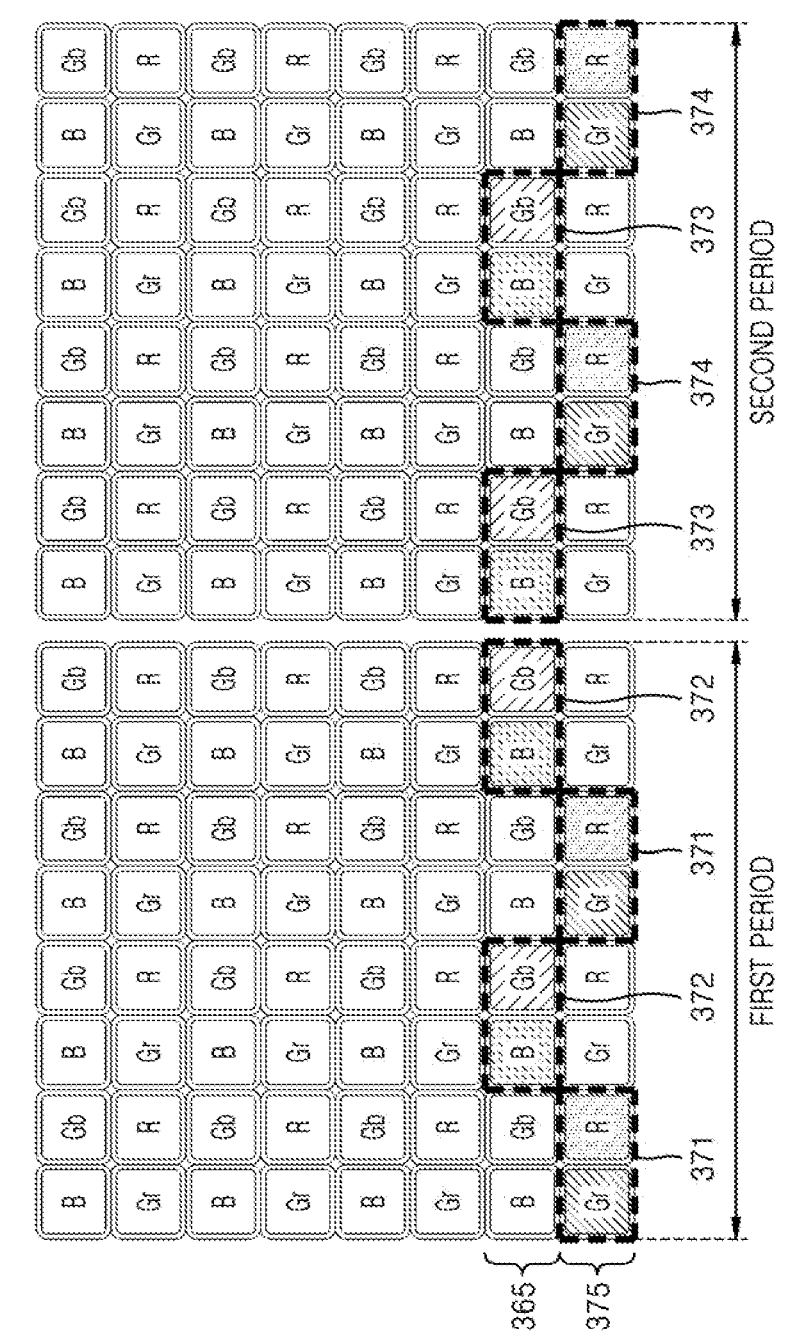
FIG. 3B is a diagram showing a read-out for rows of a pixel array according to an example embodiment.

In the pixel arrays of the image sensors 310 and 350 of FIGS. 3A and 3B, one photodiode may be included for each pixel, and photocharges generated in photodiodes of pixels selected for each period may be output as pixel signals.

Referring to FIG. 3A, the pixel array of FIG. 3A may include pixels arranged in a plurality of rows including a first row 315 and a second row 325, and a plurality of pixels of the pixel array may be arranged in an RGB pattern or a Bayer pattern. Each of the plurality of pixels may include a single photodiode, and may output, as pixel signals, photocharges generated from the photodiodes of all pixels included in a row selected for each period (e.g., a readout period).

In an embodiment, in the pixel array of the image sensor 310 of FIG. 3A, pixel signals (or pixel data) may be read out from all pixels arranged in one row during one period.

The row driver of the image sensor 310 of FIG. 3A may read out pixel signals of all pixels in the first row 315 of the pixel array during the first period and transmit, to the pixel array, control signals for reading out pixel signals of all pixels in the second row 325 of the pixel array during the second period.

Referring to FIG. 3B, the pixel array of the image sensor 350 may include multiple pixels arranged in a plurality of rows including a first row 365 and a second row 375, and a plurality of pixels of the pixel array of the image sensor 350 may be arranged in an RGB pattern or a Bayer pattern. In addition, the first row 365 and the second row 375 may be rows adjacent to each other on the pixel array.

Each of the plurality of pixels of the image sensor 350 may include one photodiode, and photocharges generated in the photodiodes of pixels of the pixel group selected for each period may be output as pixel signals.

In an embodiment, in the pixel array of the image sensor 350 of FIG. 3B, pixel signals (or pixel data) of pixel groups included in at least two rows may be read out during one period.

In an embodiment, the row driver of the image sensor 350 of FIG. 3B may transmit, to the pixel array, control signals for reading out pixel signals of a first pixel group 371 arranged on the first row 365 of the pixel array and pixel signals of a second pixel group 372 arranged on the second row 375, during the first period. In an implementation, to read out pixel signals during the first period, the row driver of the image sensor 350 may transmit the same selection signal and transmission signal to pixels in the first pixel group 371 of the first row 365 and pixels included in the second pixel group 372 of the second row 375.

In an embodiment, the row driver of the image sensor 350 of FIG. 3B may transmit, to the pixel array, control signals for reading out pixel signals of a third pixel group 374 arranged on the first row 365 of the pixel array and pixel signals of a fourth pixel group 373 arranged on the second row 375, during the second period. In an implementation, to read out pixel signals during the second period, the row driver of the image sensor 350 may transmit the same selection signal and transmission signal to pixels in the third pixel group 374 of the first row 365 and pixels included in the fourth pixel group 373 of the second row 375.

In an embodiment, as illustrated in FIG. 3B, in a pixel array, the first pixel group 371 and the third pixel group 374 may include two pixels (e.g., Gr pixels and R pixels of the first row 365) adjacent to each other in the first row 365, and the second pixel group 372 and the fourth pixel group 373 may include two pixels (e.g., B pixels and Gb pixels of the second row 375) adjacent to each other in the second row 375.

In the image sensor 310 of the comparative example illustrated in FIG. 3A, as all pixels included in a row may be simultaneously read out during one period, noise generated at the specific readout timing may appear in output data (e.g., image data) as common row noise throughout the entire row. Meanwhile, the image sensor 350 shown in FIG. 3B may distribute noise generated at a specific readout timing as pixels included in a row may be divided into a plurality of pixel groups and read out for a plurality of cycles and may improve resolution of output data by reducing row noise in output data based on the distributed noise.

Figure 4:
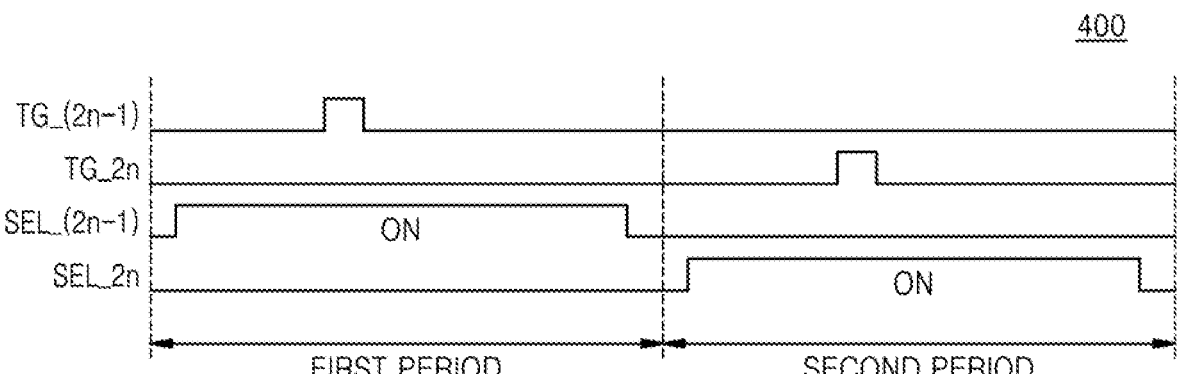
FIG. 4 is a timing diagram showing a read out of a pixel signal according to an example embodiment.
Figure 5:
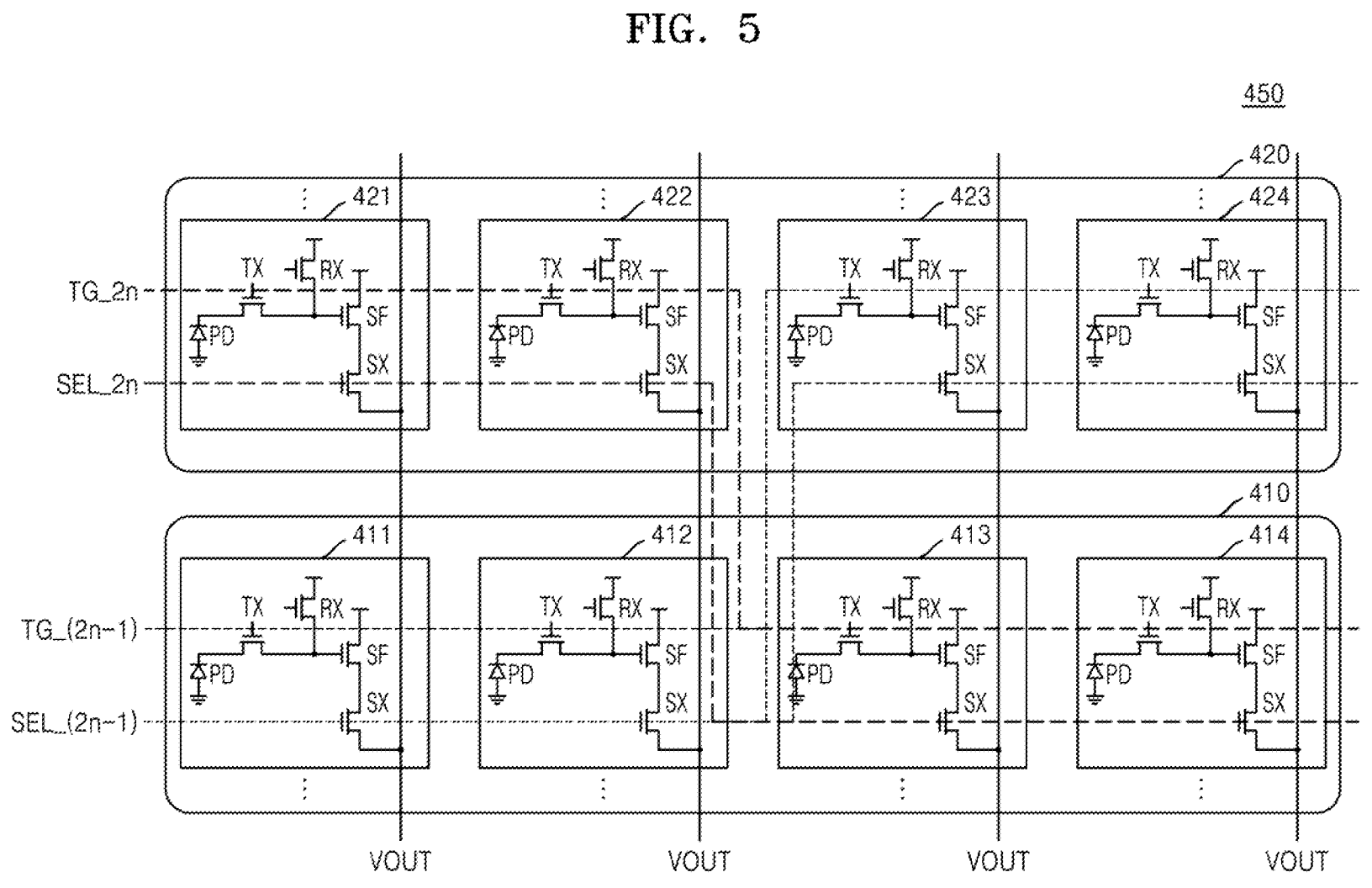

FIG. 4 is a timing diagram 400 showing a read out of a pixel signal according to an example embodiment. FIG. 5 is a circuit diagram of a pixel array 450 according to an example embodiment.

FIG. 4 is a timing diagram 400 of control signals applied to each of a plurality of pixels (e.g., a first pixel 411 to an eighth pixel 424 of FIG. 5) included in the pixel array 450 of FIG. 5 to read out pixel signals of the pixel array of FIG.

5. FIG. 5 illustrates a circuit diagram of the pixel array 450 to which the control signals may be applied based on a timing diagram of control signals for reading out pixel signals in the pixel array of FIG. 4.

The control signals of FIG. 4 may be transmitted from a row driver to a pixel array (e.g., a (2n–1)th selection signal SEL_(2n–1) or a (2n)th selection signal SEL_2n) and may include a selection signal (e.g., a SEL_(2n–1) or SEL_2n) and a transmission signal (e.g., a (2n–1)th transmission signal TG (2n–1), or a (2n)th transmission signal TG_2n).

In an implementation, the selection signal of FIG. 4 may be applied to the selection transistor SX of pixels (or pixel group) to be read out from among the plurality of pixels included in the pixel array of FIG. 5.

In an implementation, the transmission signal in FIG. 4 may be applied to the transmission transistor TX of the selected pixels (or pixel group) as a control signal for transmitting photocharges collected in the photodiode (PD) of the selected pixels (or pixel group) to the floating diffusion region of the pixels (or pixel group). In this case, the floating diffusion region may be arranged among the transmission transistor TX, the reset transistor RX, and the source follower SF in the pixel, and may be arranged at various positions.

In FIG. 4, periods for reading out pixel signals of a pixel array may be shown in a first period and a second period, and an image sensor according to an example embodiment may read out pixel signals of the pixel array based on various periods depending on a configuration of the pixel array or user settings.

Referring to FIG. 5, the pixel array 450 may include a plurality of pixels 411 to 414 and 421 to 424, which may be respectively arranged in a first row 410 and a second row 420, in which the first pixel 411 to the fourth pixel 414 may be arranged in the first row 410, and the fifth pixel 421 to the eighth pixel 424 may be arranged in the second row 420. In this case, the first row 410 and the second row 420 may be rows adjacent to each other in the pixel array 450.

Each of the pixels (e.g., the first pixel 411 to the eighth pixel 424) included in the pixel array 450 may include a photodiode PD, a transmission transistor TX, a floating diffusion region, a reset transistor RX, a source follower SF, and a selection transistor SX.

In an implementation, the photodiode PD absorbs light during an integration time to generate a photocurrent. Depending on the control signal of the row driver (e.g., the (2n–1)th transmission signal TG (2n–1), or the (2n)th transmission signal TG_2n), the photocharge (or photo current) of the photodiode PD may be amplified by the source follower SF after moving to the floating diffusion region. As the selection transistor SX receives the control signal of the row driver (e.g., the (2n–1)th selection signal SEL_(2n–1) or the (2n)th selection signal SEL_2n), the pixel signal according to the voltage level of the amplified photocharges may be output as the output signal VOUT. The reset transistor RX may initialize the photocharges stored in the floating diffusion region. Here, the integration time may mean a time when light is incident on the photodiode to sense the intensity of light.

In an embodiment, the same (2n–1)th selection signal SEL_(2n–1) and the same (2n–1)th transmission signal TG (2n–1) may be applied by the row driver to the first pixel 411 and the second pixel 412 of the first row 410, and the seventh pixel 423 and the eighth pixel 424 of the second row 420 of the pixel array of FIG. 5.

In one embodiment, the first pixel 411 and the second pixel 412 of the first row 410 in the pixel array of FIG. 5, and the seventh pixel 423 and the eighth pixel 424 of the second row 420 therein may be read out together for the same first period and may be thus grouped into one pixel group for each row, and accordingly, the first pixel 411 and the second pixel 412 of the first row 410 may form a first pixel group, and the seventh pixel 423 and the eighth pixel 424 of the second row 420 may form a second pixel group.

In an implementation, as the (2n−1)th transmission signal TG (2n−1) is turned on during the first period in FIG. 4, each of the first pixel 411 and the second pixel 412 of the first row 410 and the seventh pixel 423 and the eighth pixel 424 of the second row 420 in the pixel array of FIG. 5 may transmit charges stored in the photodiode PD to the floating diffusion region.

In addition, as the (2n−1)th selection signal SEL_(2n−1) is turned on during the first period in FIG. 4, each of the first pixel 411 and the second pixel 412 of the first row 410 and the seventh pixel 423 and the eighth pixel 424 of the second row 420 in the pixel array of FIG. 5 may output, to the ADC array, as the output signal VOUT, the pixel signal according to the voltage level of the charge stored in the floating diffusion region.

In an embodiment, the same (2n)th selection signal SEL_(2n) and the same (2n)th transmission signal TG_(2n) may be applied by the row driver to the third pixel 413 and the fourth pixel 414 of the first row 410, and the fifth pixel 421 and the sixth pixel 422 of the second row 420 of the pixel array of FIG. 5.

In one embodiment, the third pixel 413 and the fourth pixel 414 of the first row 410 in the pixel array of FIG. 5, and the fifth pixel 421 and the sixth pixel 422 of the second row 420 therein may be read out together for the same second period and may be thus grouped into one pixel group for each row, and accordingly, the third pixel 413 and the fourth pixel 414 of the first row 410 may form a third pixel group, and the fifth pixel 421 and the sixth pixel 422 of the second row 420 may form a fourth pixel group.

In an implementation, as the (2n)th transmission signal TG_(2n) is turned on during the second period in FIG. 4, each of the third pixel 413 and the fourth pixel 414 of the first row 410, and the fifth pixel 421 and the sixth pixel 422 of the second row 420 in the pixel array of FIG. 5 may transmit charges stored in the photodiode PD to the floating diffusion region.

In addition, as the (2n)th selection signal SEL_(2n) is turned on during the second period in FIG. 4, each of the third pixel 413 and the fourth pixel 414 of the first row 410, and the fifth pixel 421 and the sixth pixel 422 of the second row 420 in the pixel array of FIG. 5 may output, to the ADC array, as the output signal VOUT, the pixel signal according to the charges stored in the floating diffusion region.

In FIG. 5, pixels included in the pixel array according to an example embodiment may be in a structure including one photodiode PD for each pixel, and the pixels included in the pixel array according to the example embodiment may include various numbers of photodiodes PD depending on the purpose of use and the function thereof.

Figure 6:
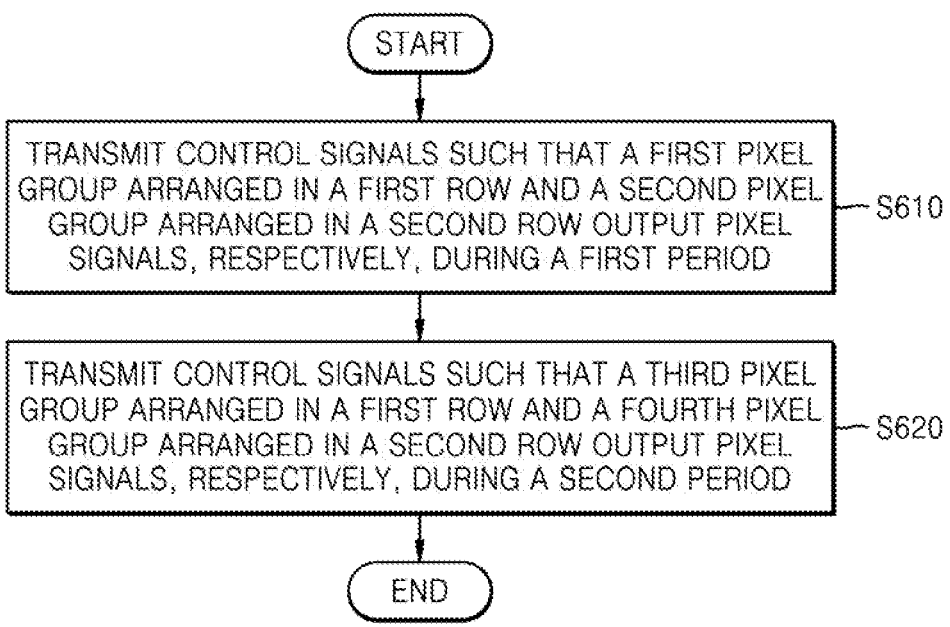
FIG. 6 is a flowchart showing steps in a method of operating an image sensor, according to an example embodiment.

FIG. 6 is a flowchart showing steps in a method of operating an image sensor, according to an example embodiment. In an implementation, FIG. 6 illustrates the row driver 120 of the image sensor 100 of FIG. 1 performing an operation of controlling the pixel array 110 to dividedly read out pixels PX included in the same row of the pixel array 110 into a plurality of timings (or a plurality of periods). The row driver 120 and the pixel array 110 of FIG. 1 may correspond to the row driver and the pixel array of FIG. 6.

Referring to FIG. 6, a control operation for dividedly reading out pixels PX included in the same row in a pixel array into a plurality of timings includes operations S610 and S620.

Each of the pixels included in the pixel array of the image sensor of FIG. 6 may include a photodiode PD, a transmission transistor TX, a floating diffusion region, a reset transistor RX, a source follower SF, and a selection transistor SX in the same manner as the pixels 411 to 414 and 421 to 424 described with reference to FIG. 5.

In operation S610, the row driver of the image sensor may transmit control signals to a first pixel group arranged in a first row of the pixel array and a second pixel group arranged in a second row of the pixel array such that the first pixel group and the second pixel group output respective pixel signals during a first period.

In an embodiment, the first row and the second row of the pixel array may be rows adjacent to each other on the pixel array, the first pixel group may be composed of pixels at locations adjacent to each other in the first row, and the second pixel group may be composed of pixels at locations adjacent to each other in the second row.

In an embodiment, as described above with reference to FIGS. 4 and 5, pixels included in the first pixel group and the second pixel group of the pixel array may receive the same control signals (e.g., a transmission signal TG (2n−1) and a selection signal SEL_(2n−1)) from the row driver during the first period.

In an implementation, during the first period, the first pixel group and the second pixel group receive the same transmission signal TG (2n−1) through the transmission transistors TX of the pixels included in the groups, and thus, the charges collected in the photodiode of each pixel included in the first pixel group and the second pixel group may be transmitted to the floating diffusion region (e.g., the floating diffusion region in FIG. 5).

In an implementation, during the first period, the first pixel group and the second pixel group may receive the same selection signal SEL (2n−1) through the selection transistors SX of the pixels included in the groups and may thus output the pixel signal according to the voltage level of the floating diffusion region in each of the pixels included in the first pixel group and the second pixel group during the first period.

In operation S620, the row driver may transmit control signals to a third pixel group arranged in a first row of the pixel array and a fourth pixel group arranged in a second row of the pixel array such that the third pixel group and the fourth pixel group output respective pixel signals during a second period.

In an embodiment, the first row and the second row of the pixel array may be rows adjacent to each other on the pixel array, the third pixel group may be composed of pixels at locations adjacent to each other in the first row, and the fourth pixel group may be composed of pixels at locations adjacent to each other in the second row.

In an embodiment, as described above with reference to FIGS. 4 and 5, pixels included in the third pixel group and the fourth pixel group of the pixel array may receive the same control signals (e.g., a transmission signal TG_(2n) and a selection signal SEL_(2n)) from the row driver during the second period.

In an implementation, during the second period, the third pixel group and the fourth pixel group receive the same transmission signal TG_(2n) through the transmission transistors TX of the pixels included in the groups, and thus, the charges collected in the photodiode of each pixel included in the third pixel group and the fourth pixel group may be transmitted to the floating diffusion region.

In an implementation, during the second period, the third pixel group and the fourth pixel group may receive the same selection signal SEL_2n through the selection transistors SX of the pixels included in the groups and may thus output the pixel signal according to the voltage level of the floating diffusion region in each of the pixels included in the third pixel group and the fourth pixel group during the second period.

The image sensor according to the example embodiment controls the dividedly readout of pixels PX included in the same row in the pixel array into a plurality of timings (or a plurality of periods), and thus, the quality of the output data may be improved by distributing the row noise in which noise at a specific readout time point is output as the noise of the entire row in the output data of the image sensor.

In an embodiment, row noise (dB) generated from output data (e.g., image data) of the image sensor may be calculated based on Equation 1.

$$\text{Row noise (dB)} = 20\log_{10}\left(\sqrt{\frac{1}{N}\cdot\sum_{j=0}^{N-1}\sigma_{row\_j}^2}/FSD\right) \quad \text{[Equation 1]}$$

Here, $\sigma_{row\_j}^2$ refers to the square of values obtained by distributing the average values of pixel signals of pixels arranged in each of the plurality of rows connected to the pixel array, N refers to the number of rows included in the pixel array, and FSD may correspond to the pixel code value.

In an implementation, row noise (dB) in the case of reading out pixel signals over two readout periods by dividing pixels in one row into two pixel groups based on Equation 1 may be reduced by $$"\frac{1}{\sqrt{2}}"$$

times the row noise generated when all pixels in one row are read out in one readout period. In other words, Equation 1 may be reduced by about 0.707 times the row noise generated when all pixels in one row are read out in one readout period.

Figure 7:
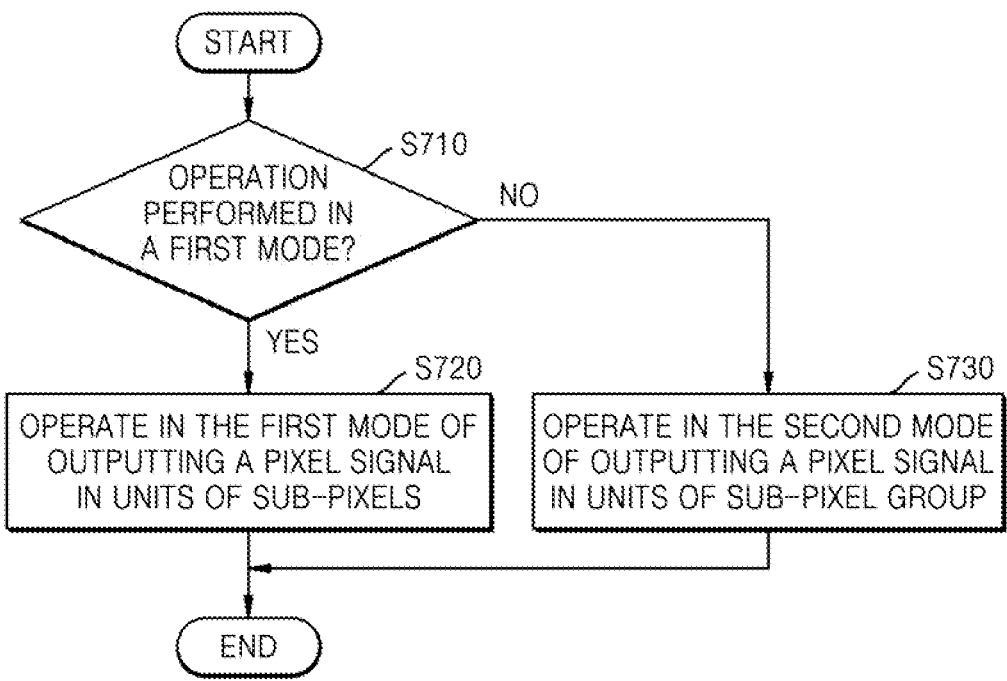
FIG. 7 is a flowchart showing steps in a method of operating an image sensor, according to an example embodiment.

FIG. 7 is a flowchart showing steps in a method of operating an image sensor, according to an example embodiment. FIG. 7 illustrates a process of outputting a pixel signal in the pixel array 110 according to an operation mode by the row driver 120 of the image sensor 100 of FIG. 1. The image sensor 100, the row driver 120, and the pixel array 110 of FIG. 1 may correspond to the image sensor, the row driver, and the pixel array of FIG. 7.

Referring to FIG. 7, the process of outputting a pixel signal in a pixel array according to an operation mode may include operations S710, S720, and S730.

Each of the pixels included in the pixel array of the image sensor of FIG. 7 may include four photodiodes PD, a transmission transistor TX, a floating diffusion region, a reset transistor RX, a source follower SF, and a selection transistor SX in the same manner as pixels 831-1 to 844-2 shown in FIG. 8.

In operation S710, the image sensor may determine whether to operate in a first mode. The operation mode of the image sensor may be determined based on any one of an amount of light received in the pixel array, an operation period of the image sensor, or a photographing mode selected by a user.

In an embodiment, a first mode of the image sensor may mean a mode in which each of the four photodiodes PD included in the pixel of the pixel array operates as different sub-pixels (e.g., R sub-pixels sensing red color, Gb sub-pixels sensing green color, B sub-pixels sensing blue color, and Gr sub-pixels sensing green color), to output different pixel signals.

In an embodiment, a second mode of the image sensor may mean a mode in which four photodiodes PD included in the pixel of the pixel array may be grouped into one sub-pixel group, and the four photodiodes PD included in the one sub-pixel group operate as one pixel together to output pixel signals in units of the one sub-pixel group.

In an implementation, when a photographing mode selected by a user in a device including an image sensor is in a high resolution photographing mode, the image sensor may operate in a first mode in which each of the four photodiodes operates as one sub-pixel to output image data based on fine sensing with respect to ambient light, and each sub-pixel signal may be output from each of the four photodiodes in a sub-pixel unit.

In an implementation, when the amount of light received in the pixel array of the image sensor is less than a threshold value, the image sensor may operate in a second mode in which the pixel signal is output in units of sub-pixel groups (e.g., pixels) generated by combining four photodiodes to receive an amount of light as much as possible from the surroundings.

In an implementation, when a photographing mode selected by a user in a device including an image sensor is a fast photographing mode, the image sensor may operate in a second mode of generating a sub-pixel group by combining four photodiodes to receive an amount of light as much as possible within a shortened readout period for fast photographing, and outputting a pixel signal to a sub-pixel group unit (e.g., a pixel).

When the image sensor operates in the first mode, in operation S720, the image sensor may operate in the first mode of outputting a pixel signal in units of sub-pixels. In an implementation, the pixel signal of the first mode may refer to four sub-pixel signals read out for each of the four photodiodes included in one pixel, as described above in operation S710.

When the image sensor operates in the second mode, in operation S730, the image sensor may operate in the second mode of outputting a pixel signal in units of sub-pixel group. In an implementation, as described above in operation S710, the pixel signal of the second mode may refer to one pixel signal generated by receiving light in a sub-pixel group unit (e.g., a pixel) generated by combining four photodiodes included in one pixel.

In an embodiment, the image sensor may generate a sub-pixel group to output a pixel signal of the second mode. In an implementation, the image sensor may group four photodiodes PD included in one pixel. A method of generating a sub-pixel group and a sub-pixel group may be generated by grouping photodiodes PD adjacent to each other on a pixel array.

The image sensor according to an example embodiment may also be applied even when the operating mode varies depending on the surrounding environment of the image sensor or a device option selected by a user, and the pixel signals of the sub-pixel signals or the sub-pixel group may be read out by changing the timings of the pixels included in the same row of the pixel array in each operation mode, thereby reducing the influence of the row noise in the output image data and improving the quality of the output image data.

Figure 8A:
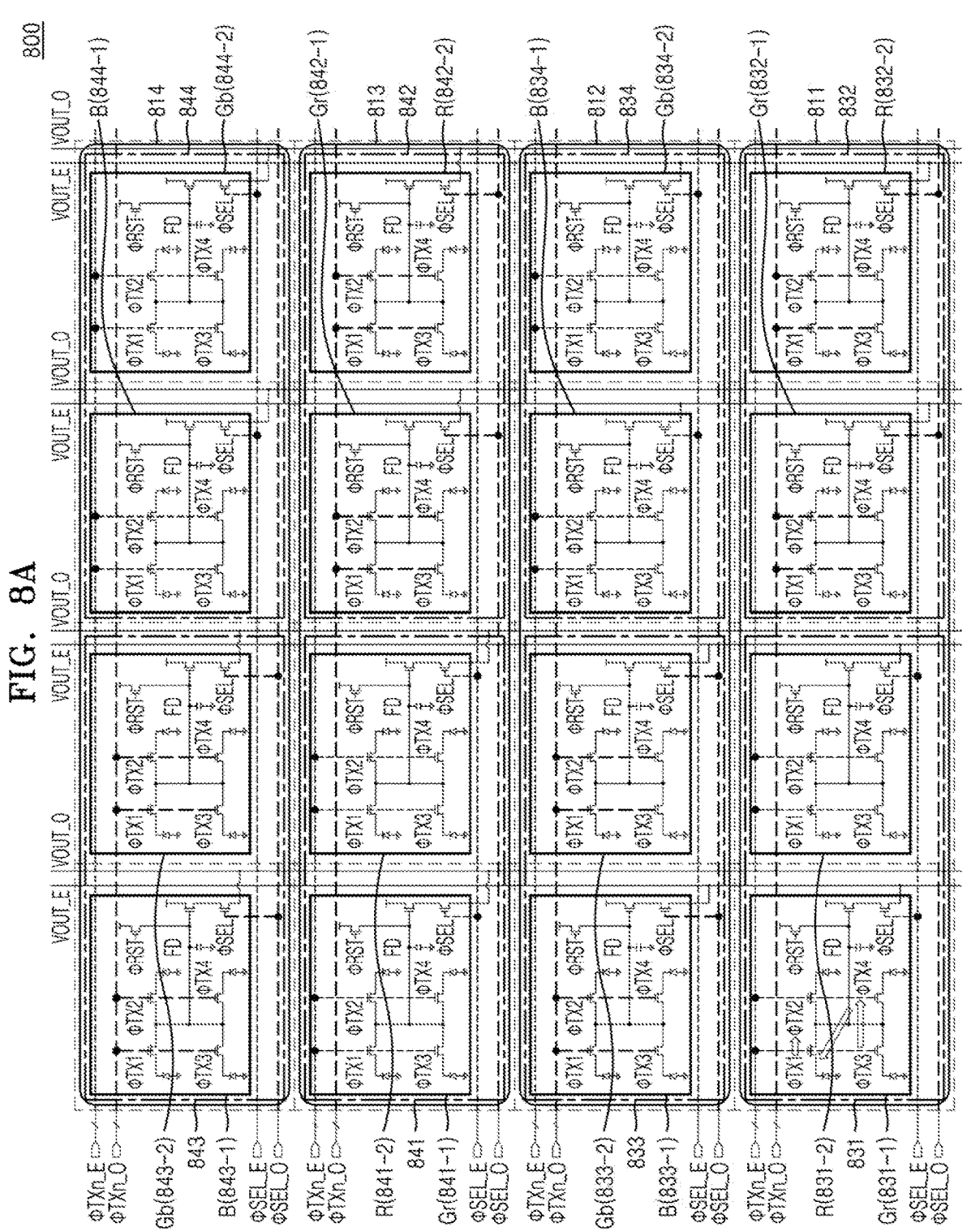
FIG. 8A is a circuit diagram of a pixel array according to an example embodiment.

FIG. 8A is a circuit diagram of a pixel array 800 according to an example embodiment. FIG. 8A illustrates a circuit diagram of a pixel array 800 to which the control signals may be applied based on a timing diagram of control signals for reading out the pixel signals of FIG. 8B to be described later.

Referring to FIG. 8A, the pixel array may include a plurality of pixels 831-1 to 844-2 arranged in a first row 811, a second row 812, a third row 813, and a fourth row 814. In an embodiment, a first pixel Gr (831-1), a second pixel R (831-2), a third pixel Gr (832-1), and a fourth pixel R (832-2)) may be arranged in the first row 811, and a fifth pixel B (833-1), a sixth pixel Gb (833-2), a seventh pixel B (833-2), and an eighth pixel Gb (834-2) may be arranged in the second row 812. The first row 811 and the second row 812 may be rows adjacent to each other in the pixel array.

In an embodiment, the pixel group may include pixels adjacent to each other in the pixel array. In an implementation, a first pixel group 831 may include the first pixel Gr (831-1) and the second pixel R (831-2) of the first row 811, and a second pixel group 834 may include the seventh pixel B (834-1) and the eighth pixel Gb (834-2) of the second row 812. In an implementation, a third pixel group 832 may include the third pixel Gr (832-1) and the fourth pixel R (832-2) of the first row 811, and a fourth pixel group 833 may include the fifth pixel B (833-1) and the sixth pixel Gb (833-2) of the second row 812.

In an implementation, a fifth pixel group 841 may include a ninth pixel Gr (841-1) and a tenth pixel R (841-2) of the third row 813, and a sixth pixel group 844 may include a fifteenth pixel B (844-1) and a sixteenth pixel Gb (844-2) of the fourth row 814. In an implementation, a seventh pixel group 842 may include an eleventh pixel Gr (842-1) and a twelfth pixel R (842-2) of the third row 813, and an eighth pixel group 843 may include a thirteenth pixel B (843-1) and a fourteenth pixel Gb (843-2) of the fourth row 814.

The description of the readout operation for the first row 811 and the second row 812 may be equally applied to that of the readout operation for the third row 813 and the fourth row 814.

As illustrated in FIG. 8A, each of the pixels (e.g., the first pixel 831-1 to the eighth pixel 834-2) included in the pixel array may include four photodiodes PD, four transmission transistors TX, a floating diffusion region FD, a reset transistor RST, a source follower, and a selection transistor.

Each of the four photodiodes PD (e.g., the first photodiode to the fourth photodiode) may be electrically connected to each of the first to fourth transmission transistors TX1 to TX4 to operate as a first sub-pixel to a fourth sub-pixel in each pixel. However, the four photodiodes PD (e.g., the first photodiode to the fourth photodiode) may share the floating diffusion region FD, the reset transistor RST, the source follower, and the selection transistor included in the pixel.

In an embodiment, in order to dividedly read out a plurality of pixel groups included in the same row of the pixel array for into a plurality of periods, each of the pixel groups included in the same row may receive different transmission signals (e.g., ΦTXn_O or ΦTXn_E) and different selection signals (e.g., ΦSEL_O or ΦSEL_E).

Therefore, each row of the pixel array may be electrically connected to the row driver through a plurality of transmission signal paths to receive different transmission signals (e.g., ΦTXn_O or ΦTXn_E) for each pixel group. In addition, each row of the pixel array may be electrically connected to the row driver through a plurality of selection signal paths to receive different selection signals (e.g., ΦSEL_O or ΦSEL_E) for each pixel group.

In an embodiment, the pixel signals of the pixel groups included in the first row 811 and the second row 812 of the pixel array (e.g., the first pixel group 831 to the fourth pixel group 834) may be transmitted (or output) to the ADC array as an output signal VOUT_E, and the pixel signals of the pixel groups included in the third row 813 and the fourth row 814 of the pixel array (e.g., the fifth pixel group 841 to the eighth pixel group 844) may be transmitted (or output) to the ADC array as an output signal VOUT_0.

When pixel groups included in the same row receive different transmission signals and different selection signals, a dividedly read-out operation may be performed for each period at a plurality of periods will be described in detail based on a timing diagram of the signal of FIG. 8B described below and a readout operation for pixel groups of the pixel array of FIG. 8C.

Figure 8B:
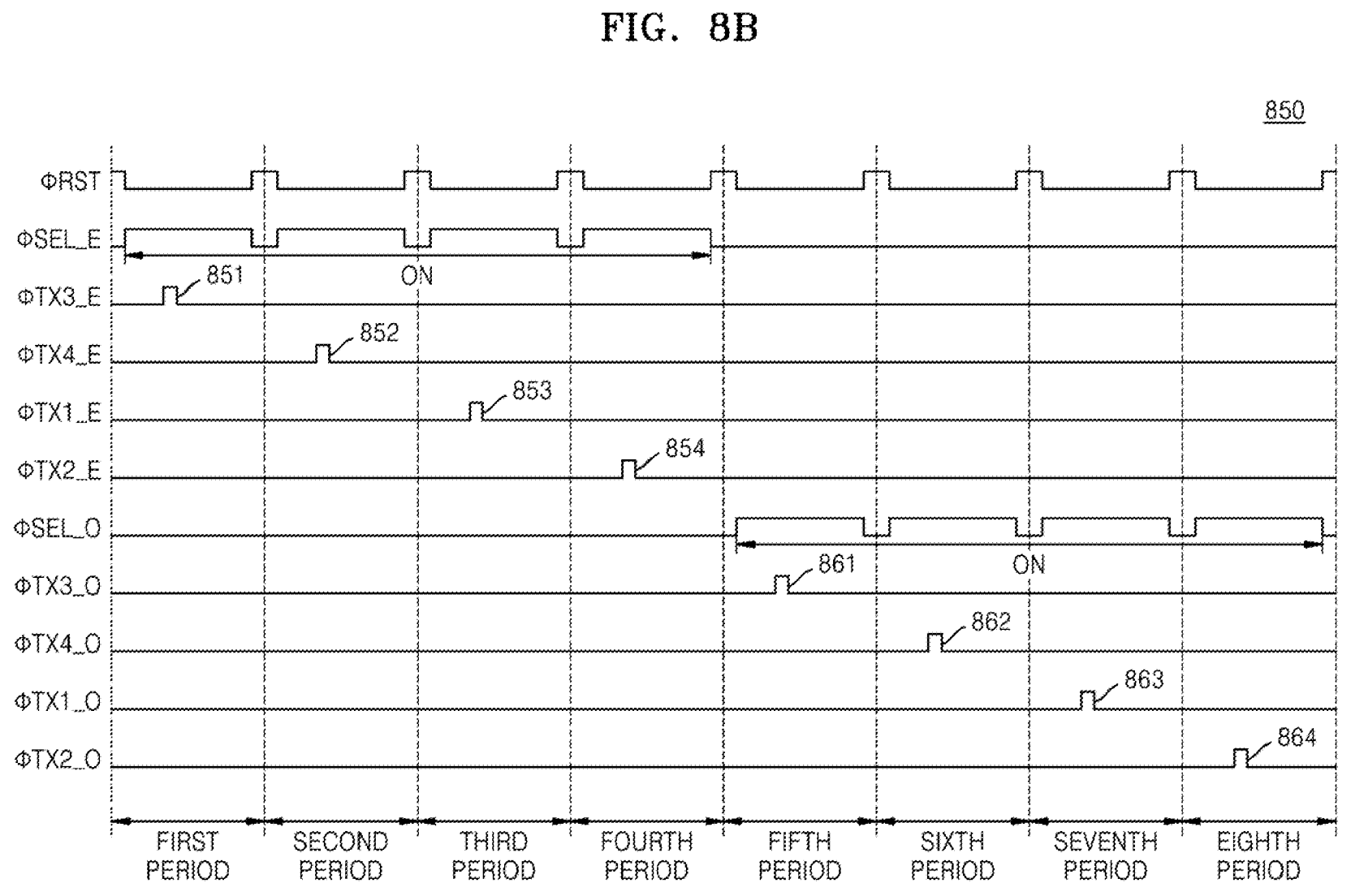

FIG. 8B is a timing diagram 850 showing a read out of a pixel signal in a pixel array according to an example embodiment. FIG. 8B is a timing diagram 850 of control signals applied to each of a plurality of pixel groups (e.g., the first pixel group 831 to the eighth pixel group 843) included in the pixel array of FIG. 8A to read out pixel signals for each pixel group in the pixel array of FIG. 8A.

Figure 8C:
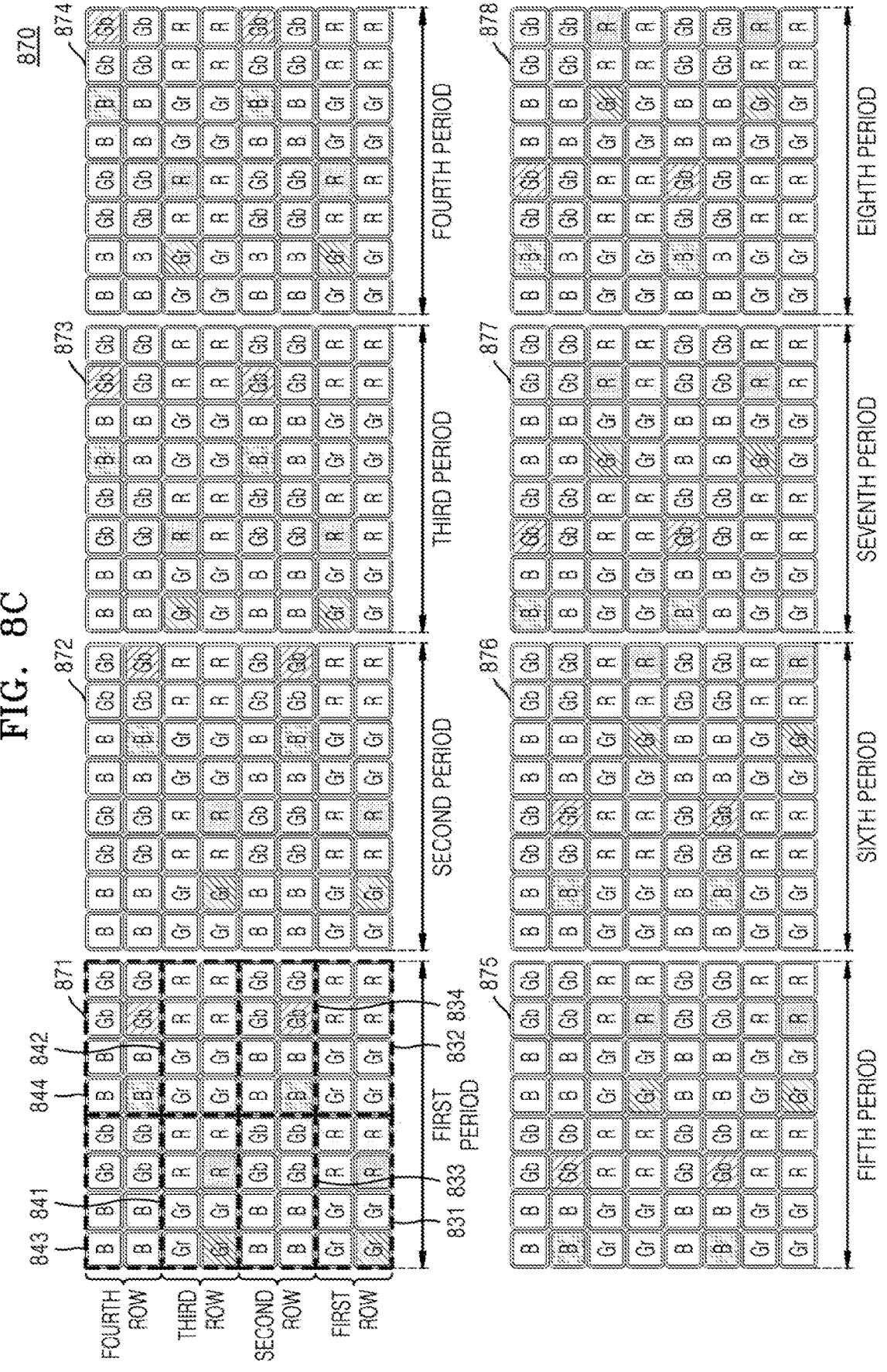
FIG. 8C is a diagram showing a read-out of multiple pixels of a pixel array according to an example embodiment.

In the image sensor of FIGS. 8B and 8C, it is assumed that each of the four photodiodes included in each pixel of the pixel array of FIG. 8A operates in different sub-pixels to output each pixel signal (e.g., an operation of the first mode described in operation S720 of FIG. 7).

Referring to FIG. 8B, a period for reading out the pixel array of FIG. 8A may include first to eighth periods, and a control signal received from the row driver to the pixel array at each period may include a transmission signal (e.g., ΦTXn_E or ΦTXn_O), a selection signal (e.g., ΦSEL_E or ΦSEL_O), and a reset signal (e.g., ΦRST).

In one embodiment, a selection signal (e.g., ΦSEL_E or ΦSEL_O) may refer to a signal for selecting a pixel group to be read out at a corresponding period from among a plurality of pixel groups included in the pixel array of FIG. 8A, and a transmission signal (e.g., ΦTXn_E or ΦTXn_O) may refer to a signal for indicating a sub-pixel (or photodiode) to be read out at a corresponding period within the pixel of the selected pixel group. The reset signal (e.g., (RST) may refer to a signal for resetting, to a power voltage, a floating diffusion region included in the selected pixel group.

In an implementation, referring to FIGS. 8A and 8B, during the first period 851 to the fourth period 854, the first pixel group 831, the second pixel group 834, the fifth pixel group 841, and the sixth pixel group 844 receive the same selection signal ΦSEL_E. and the third pixel group 832, the fourth pixel group 833, the seventh pixel group 842, and the eighth pixel group 843 may receive the same selection signal ΦSEL_O during the fifth period 861 to the eighth period 864.

FIG. 8C is a diagram showing a read-out of multiple pixels of a pixel array according to an example embodiment. Hereinafter, a readout operation for pixel groups of the pixel array 870 in the pixel array shown in FIG. 8A is described for each period (e.g., the first period 871 to the eighth period 878) based on the timing diagram of the control signal shown in FIG. 8B. In the present specification, each of a plurality of photodiodes included in one pixel arranged in a pixel array and a transmission transistor TX connected thereto may operate as one sub-pixel.

Referring to FIGS. 8A to 8C, in the case of the first period 871 to the fourth period 874, as the selection signal ΦSEL_E of the timing diagram 850 of FIG. 8B is turned on, the first pixel group 831 of the first row 811, the second pixel group 834 of the second row 812, the fifth pixel group 841 of the third row 813, and the sixth pixel group 844 of the fourth row 814 of FIG. 8A may be selected. Pixel signals of the first period 871 to the fourth period 874 may be output based on photocharges generated from the pixels in the selected pixel groups.

In the case of the first period 871, as the first transmission signal ΦTX3_E (851) of the timing diagram 850 of FIG. 8B is turned on, the photocharges generated by the third sub-pixels electrically connected to the TX3 (e.g., the third photodiode of the first pixel 831-1 and the third photodiode of the second pixel 831-2), in the first pixel 831-1 and the second pixel 831-2 of the first pixel group 831 of FIG. 8A may be transmitted to the floating diffusion region FD, and pixel signals according to voltage levels obtained by amplifying the transmitted photocharges may be output.

During the first period 871, the output processes of the pixel signals in the first pixel 831-1 and the second pixel 831-2 may be equally applied to the third sub-pixels electrically connected to the TX3 in the seventh pixel 834-1 and the eighth pixel 834-2 of the second pixel group 834, the third sub-pixels electrically connected to the TX3 in the ninth pixel 841-1 and the tenth pixel 841-2 of the fifth pixel group 841, and the third sub-pixels electrically connected to the TX3 in the fifteenth pixel 844-1 and the sixteenth pixel 844-2 of the sixth pixel group 844.

In the case of the second period 872, as the second transmission signal ΦTX4_E (852) of the timing diagram 850 of FIG. 8B is turned on, the photocharges generated by the fourth sub-pixels electrically connected to the TX3 (e.g., the fourth photodiode of the first pixel 831-1 and the fourth photodiode of the second pixel 831-2) in the first pixel 831-1 and the second pixel 831-2 of the first pixel group 831 of FIGS. 8A and 8C may be transmitted to the floating diffusion region FD, and pixel signals according to voltage levels obtained by amplifying the transmitted photocharges may be output.

During the second period 872, the output processes of the pixel signals in the first pixel 831-1 and the second pixel 831-2 may be equally applied to the fourth sub-pixels electrically connected to the TX4 in the seventh pixel 834-1 and the eighth pixel 834-2 of the second pixel group 834, the fourth sub-pixels electrically connected to the TX4 in the ninth pixel 841-1 and the tenth pixel 841-2 of the fifth pixel group 841, and the fourth sub-pixels electrically connected to the TX4 in the fifteenth pixel 844-1 and the sixteenth pixel 844-2 of the sixth pixel group 844.

In the case of the third period 873, as the third transmission signal ΦTX1_E (853) of the timing diagram 850 of FIG. 8B is turned on, the photocharges generated by the first sub-pixels electrically connected to the TX1 (e.g., the first photodiode of the first pixel 831-1 and the first photodiode of the second pixel 831-2) in the first pixel 831-1 and the second pixel 831-2 of the first pixel group 831 of FIGS. 8A and 8C may be transmitted to the floating diffusion region FD, and pixel signals according to voltage levels obtained by amplifying the transmitted photocharges may be output.

During the third period 873, the output processes of the pixel signals in the first pixel 831-1 and the second pixel 831-2 may be equally applied to the first sub-pixels electrically connected to the TX1 in the seventh pixel 834-1 and the eighth pixel 834-2 of the second pixel group 834, the first sub-pixels electrically connected to the TX1 in the ninth pixel 841-1 and the tenth pixel 841-2 of the fifth pixel group 841, and the first sub-pixels electrically connected to the TX1 in the fifteenth pixel 844-1 and the sixteenth pixel 844-2 of the sixth pixel group 844.

In the case of the fourth period 874, as the fourth transmission signal ΦTX2_E (854) of the timing diagram 850 of FIG. 8B is turned on, the photocharges generated by the second sub-pixels electrically connected to the TX2 (e.g., the second photodiode of the first pixel 831-1 and the second photodiode of the second pixel 831-2), in the first pixel 831-1 and the second pixel 831-2 of the first pixel group 831 of FIGS. 8A and 8C may be transmitted to the floating diffusion region FD, and pixel signals according to voltage levels obtained by amplifying the transmitted photocharges may be output.

During the fourth period 874, the output processes of the pixel signals in the first pixel 831-1 and the second pixel 831-2 may be equally applied to the second sub-pixels electrically connected to the TX2 in the seventh pixel 834-1 and the eighth pixel 834-2 of the second pixel group 834, the second sub-pixels electrically connected to the TX2 in the ninth pixel 841-1 and the tenth pixel 841-2 of the fifth pixel group 841, and the second sub-pixels electrically connected to the TX2 in the fifteenth pixel 844-1 and the sixteenth pixel 844-2 of the sixth pixel group 844.

Referring to FIGS. 8A to 8C, in the case of the fifth period 875 to the eighth period 878, as the selection signal ΦSEL_0 of the timing diagram 850 of FIG. 8B is turned on, the third pixel group 832 of the first row 811, the fourth pixel group 833 of the second row 812, the seventh pixel group 842 of the third row 813, and the eighth pixel group 843 of the fourth row 814 of FIG. 8A may be selected. Pixel signals of the fifth period 875 to the eighth period 878 may be output using photocharges generated from the pixels in the selected pixel groups.

In the case of the fifth period 875, as the fifth transmission signal ΦTX3_0 (861) of the timing diagram 850 of FIG. 8B is turned on, the photocharges generated by the third sub-pixels electrically connected to the TX3 (e.g., the third photodiode of the third pixel 832-1 and the third photodiode of the fourth pixel 832-2), in the third pixel 832-1 and the fourth pixel 832-2 of the third pixel group 832 of FIGS. 8A and 8C may be transmitted to the floating diffusion region FD, and pixel signals according to voltage levels obtained by amplifying the transmitted photocharges may be output.

During the fifth period 875, the output processes of the pixel signals in the third pixel 832-1 and the fourth pixel 832-2 may be equally applied to the third sub-pixels electrically connected to the TX3 in the fifth pixel 833-1 and the sixth pixel 833-2 of the fourth pixel group 833, the third sub-pixels electrically connected to the TX3 in the eleventh pixel 842-1 and the twelfth pixel 841-2 of the seventh pixel group 842, and the third sub-pixels electrically connected to the TX3 in the thirteenth pixel 843-1 and the fourteenth pixel 843-2 of the eighth pixel group 843.

In the case of the sixth period 876, as the sixth transmission signal ΦTX4_0 (862) of the timing diagram 850 of FIG. 8B is turned on, the photocharges generated by the fourth sub-pixels electrically connected to the TX4 (e.g., the fourth photodiode of the third pixel 832-1 and the fourth photodiode of the fourth pixel 832-2), in the third pixel 832-1 and the fourth pixel 832-2 of the third pixel group 832 of FIGS. 8A and 8C may be transmitted to the floating diffusion region FD, and pixel signals according to voltage levels obtained by amplifying the transmitted photocharges may be output.

During the sixth period 876, the output processes of the pixel signals in the third pixel 832-1 and the fourth pixel 832-2 may be equally applied to the fourth sub-pixels electrically connected to the TX4 in the fifth pixel 833-1 and the sixth pixel 833-2 of the fourth pixel group 833, the fourth sub-pixels electrically connected to the TX4 in the eleventh pixel 842-1 and the twelfth pixel 841-2 of the seventh pixel group 842, and the fourth sub-pixels electrically connected to the TX4 in the thirteenth pixel 843-1 and the fourteenth pixel 843-2 of the eighth pixel group 843.

In the case of the seventh period 877, as the seventh transmission signal ΦTX1_0 (863) of the timing diagram 850 of FIG. 8B is turned on, the photocharges generated by the firth sub-pixels electrically connected to the TX1 (e.g., the first photodiode of the third pixel 832-1 and the first photodiode of the fourth pixel 832-2), in the third pixel 832-1 and the fourth pixel 832-2 of the third pixel group 832 of FIGS. 8A and 8C may be transmitted to the floating diffusion region FD, and pixel signals according to voltage levels obtained by amplifying the transmitted photocharges may be output.

During the seventh period 877, the output processes of the pixel signals in the third pixel 832-1 and the fourth pixel 832-2 may be equally applied to the first sub-pixels electrically connected to the TX1 in the fifth pixel 833-1 and the sixth pixel 833-2 of the fourth pixel group 833, the first sub-pixels electrically connected to the TX1 in the eleventh pixel 842-1 and the twelfth pixel 841-2 of the seventh pixel group 842, and the first sub-pixels electrically connected to the TX1 in the thirteenth pixel 843-1 and the fourteenth pixel 843-2 of the eighth pixel group 843.

In the case of the eighth period 878, as the eighth transmission signal ΦTX2_0 (864) of the timing diagram 850 of FIG. 8B is turned on, the photocharges generated by the second sub-pixels electrically connected to the TX2 (e.g., the second photodiode of the third pixel 832-1 and the second photodiode of the fourth pixel 832-2), in the third pixel 832-1 and the fourth pixel 832-2 of the third pixel group 832 of FIGS. 8A and 8C may be transmitted to the floating diffusion region FD, and pixel signals according to voltage levels obtained by amplifying the transmitted photocharges may be output.

During the eighth period 878, the output processes of the pixel signals in the third pixel 832-1 and the fourth pixel 832-2 may be equally applied to the second sub-pixels electrically connected to the TX2 in the fifth pixel 833-1 and the sixth pixel 833-2 of the fourth pixel group 833, the second sub-pixels electrically connected to the TX2 in the eleventh pixel 842-1 and the twelfth pixel 841-2 of the seventh pixel group 842, and the second sub-pixels electrically connected to the TX2 in the thirteenth pixel 843-1 and the fourteenth pixel 843-2 of the eighth pixel group 843.

Figure 9A:
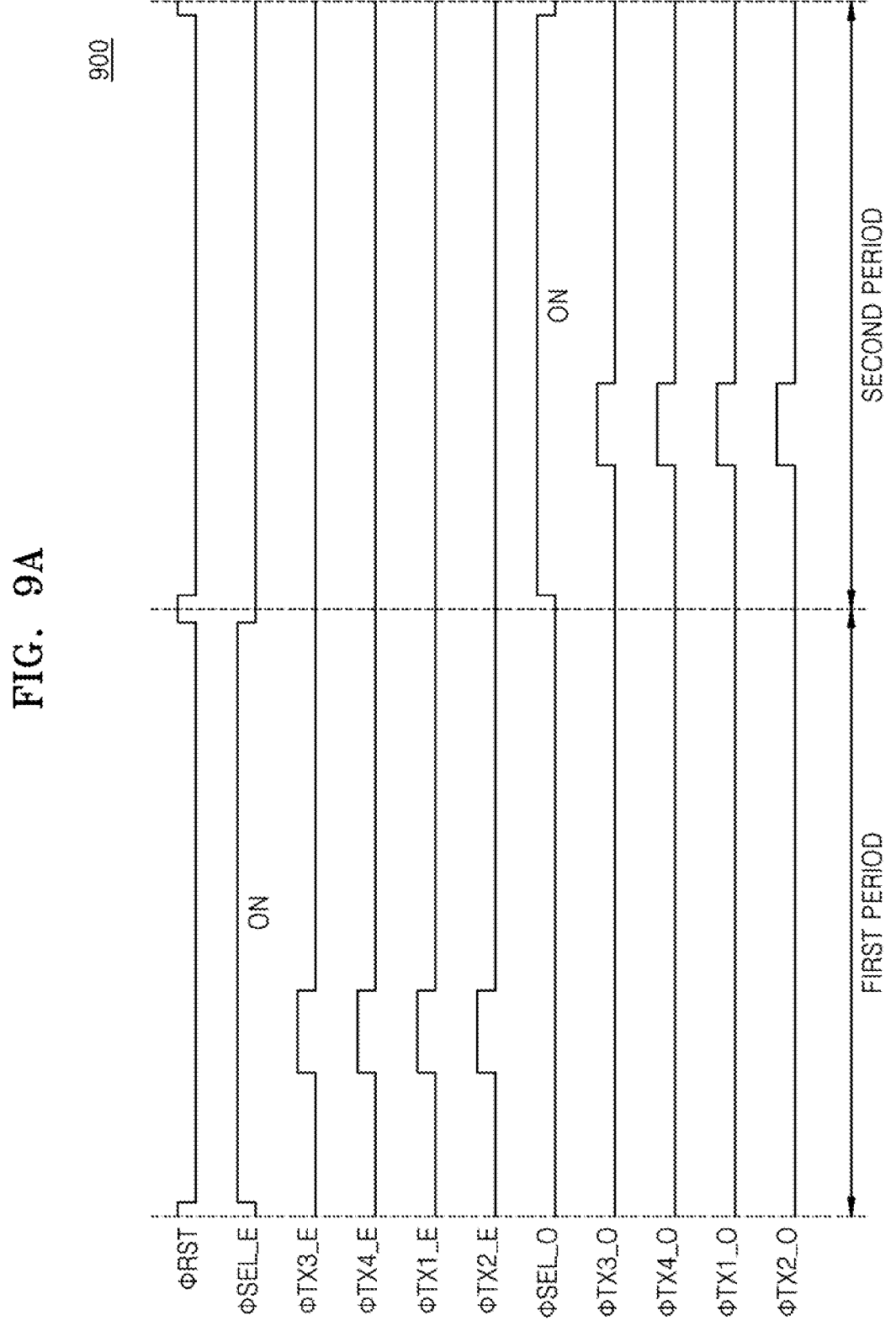
FIG. 9A is a timing diagram showing a read out of a pixel signal in a pixel array according to an example embodiment.

FIG. 9A is a timing diagram 900 showing a read out of a pixel signal in a pixel array according to an example embodiment. FIG. 9B is a diagram showing a read-out of multiple pixels of a pixel array according to an example embodiment.

Figure 9B:
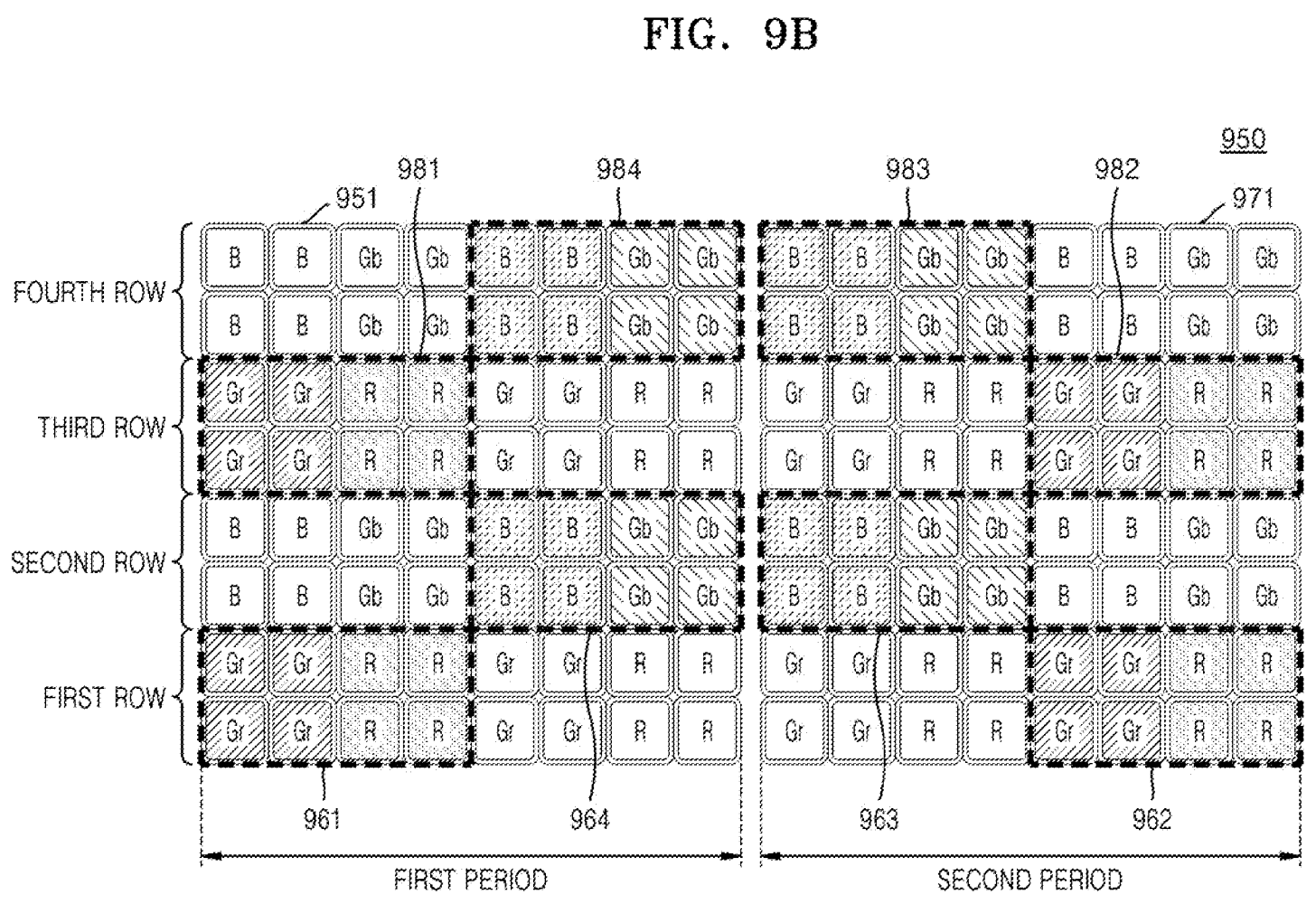

In an implementation, referring to FIGS. 9A and 9B, it is assumed that four photodiodes (or first to fourth sub-pixels) included in each pixel of the pixel array of FIG. 8A described above generate one sub-pixel group and output a pixel signal in units of the generated sub-pixel groups (e.g., an operation in the second mode described in operation S730 of FIG. 7).

Referring to FIGS. 9A and 9B, in the case of a first period 951 of FIG. 9B, as the selection signal ΦSEL_E of the timing diagram 900 of FIG. 9A is turned on, a first pixel group 961 of the first row, a second pixel group 964 of the second row, and a fifth pixel group 981 of the third row, and a sixth pixel group 984 of the fourth row may be selected.

In the case of the first period 951, as the first transmission signal ΦTX3_E, the second transmission signal ΦTX4_E, the third transmission signal ΦTX1_E, and the fourth transmission signal ΦTX2_E of the timing diagram 900 of FIG. 9A may be turned on, the image sensor in one embodiment may output pixel signals of the first sub-pixel group R and the second sub-pixel group R in the first pixel group 961, the seventh sub-pixel group B and the eighth sub-pixel group Gb in the second pixel group 964, the ninth sub-pixel group Gr and the tenth sub-pixel group R in the fifth pixel group 981, and the fifteenth sub-pixel group B and the sixteenth sub-pixel group Gb of the sixth pixel group 984 of FIG. 9B.

Referring to FIGS. 9A and 9B, in the case of a second period 971 of FIG. 9B, as the selection signal ΦSEL_0 of the timing diagram 900 of FIG. 9A is turned on, a third pixel group 962 of the first row, a fourth pixel group 963 of the second row, and a seventh pixel group 982 of the third row, and an eighth pixel group 983 of the fourth row may be selected.

In the case of the second period 952, as the fifth transmission signal ΦTX3_0, the sixth transmission signal ΦTX4_0, the seventh transmission signal ΦTX1_0, and the eighth transmission signal ΦTX2_0 of the timing diagram 900 of FIG. 9A may be turned on, the image sensor in one embodiment may output pixel signals of the third sub-pixel group Gr and the fourth sub-pixel group R in the third pixel group 962, the fifth sub-pixel group B and the sixth sub-pixel group Gb in the fourth pixel group 963, the eleventh sub-pixel group Gr and the twelfth sub-pixel group R in the seventh pixel group 982, and the thirteenth sub-pixel group B and the fourteenth sub-pixel group Gb of the eighth pixel group 983.

The image sensor according to an example embodiment may be applied to a case of combining a plurality of sub-pixels (or a plurality of photodiodes) included in a pixel according to an operation mode to output a pixel signal in units of sub-pixel groups, thereby reducing the influence of row noise and improving the quality of output image data.

Figure 10:
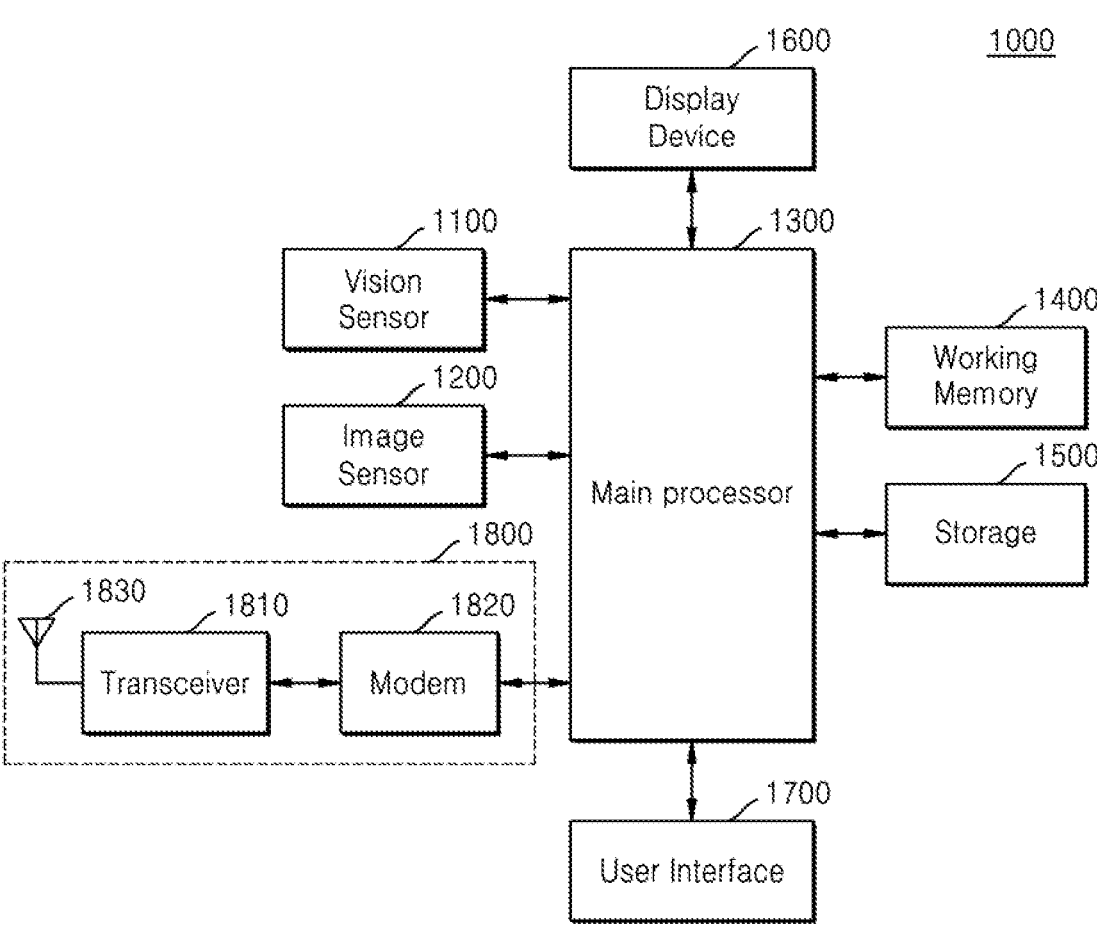
FIG. 10 is a block diagram showing an electronic device to which an image sensor is applied according to an example embodiment.

FIG. 10 is a block diagram showing an electronic device to which an image sensor is applied according to an example embodiment. Referring to FIG. 10, the electronic device 1000 may include a vision sensor 1100, an image sensor 1200, a main processor 1300, a working memory 1400, a storage 1500, a display device 1600, a user interface 1700, and a communication unit 1800.

The image sensor 100 described with reference to FIGS. 1 to 9B may be applied as the image sensor 1200. The vision sensor 1100 may sense an object to generate event signals and transmit the generated event signals to the main processor 1300. The image sensor 1200 may generate image data, e.g., raw image data, based on the received optical signal, and provide the image data to the main processor 1300.

The main processor 1300 may control the overall operation of the electronic device 1000, and when the image sensor 1200 performs a read-out operation on the pixel array, the main processor 1300 controls the image sensor 1200 to dividedly read out the pixel signals of the plurality of pixel groups included in the same row of the pixel array into a plurality of periods.

The main processor 1300 may determine the operation mode of the image sensor 1200 based on any one of a light reception amount in the pixel array, an operation period of the image sensor, or a photographing mode selected by a user.

In an implementation, the main processor 1300 may control each of the four photodiodes PD included in the pixel group of the image sensor 1200 to operate as different sub-pixels (e.g., R sub-pixel, Gb sub-pixel, B sub-pixel, and Gr sub-pixel) and output different pixel signals depending on the operation mode.

In an implementation, the main processor 1300 may group four photodiodes PD included in pixels inside the pixel group of the image sensor 1200 into one sub-pixel group, and control the four photodiodes PD included in the one sub-pixel group to operate together as one pixel to output pixel signals in units of one sub-pixel group.

The working memory 1400 may store data used for the operation of the electronic device 1000. In an implementation, the working memory 1400 may temporarily store packets or frames processed by the main processor 1300.

In an implementation, the working memory 1400 may include volatile memory such as Dynamic RAM (DRAM), synchronous DRAM (SDRAM), and/or nonvolatile memory such as Phase-change RAM (PRAM), Magneto-resistive RAM (MRAM), Resistive RAM (ReRAM), and Ferro-electric RAM (FRAM).

The storage 1500 may store data requested to be stored from the main processor 1300 or other components. The storage 1500 may include a nonvolatile memory such as a flash memory, a PRAM, an MRAM, a ReRAM, and an FRAM.

The display device 1600 may include a display panel, a display driving circuit, and a display serial interface (DSI). In an implementation, the display panels may be implemented with various devices such as Liquid Crystal Display (LCD) devices, Light Emitting Diode (LED) displays, Organic LED (OLED) displays, and Active Matrix OLED (AMOLED) displays. The display driving circuit may include a timing controller, a source driver, and the like required to drive the display panel. The DSI host embedded in the main processor 1300 may perform serial communication with the display panel through the DSI.

The user interface 1700 may include input interfaces such as a keyboard, mouse, keypad, button, touch panel, touch screen, touch pad, touch ball, gyroscope sensor, vibration sensor, or acceleration sensor.

The communication unit 1800 may exchange signals with an external device/system through an antenna 1830. A transceiver 1810 and a modulator/demodulator (MODEM) 1820 of the communication unit 1800 may process signals exchanged with an external device/system according to wireless communication protocols, such as Long Term Evolution (LTE), Worldwide Interoperability for Microwave Access (WIMAX), Global System for Mobile Communications (GSM), Code Division Multiple Access (CDMA), Bluetooth®, Near Field Communication (NFC), Wireless Fidelity (Wi-Fi), and Radio Frequency Identification (RFID).

Components of the electronic device 1000, e.g., the vision sensor 1100, the image sensor 1200, the main processor 1300, the working memory 1400, the storage 1500, the display device 1600, the user interface 1700, and the communication unit 1800, may exchange data under one or more of various interface protocols, such as a Universal Serial Bus (USB), a Small Computer System Interface (SCSI), a MIPI, an I2C, a Peripheral Component Interconnect Express (PCIe), a Mobile PCIe (M-PCIe), an Advanced Technology Attachment (ATA), a Parallel Efficient Interconnect Express (PATA), a Serial ATA (SATA), a Serial Attached SCSI (SAS), an Integrated Drive Electronics (IDE), an Enhanced IDE (EIDE), a Nonvolatile Memory Express (NVMe), or a Universal Flash Storage (UFS).

It will be understood that various changes in form and details may be made therein without departing from the spirit and scope of the following claims.

By way of summation and review, an image processing device for reducing noise generated from image data is disclosed. The image processing device may generate an image of an object by using a photoelectric conversion device that reacts according to the intensity of light reflected from the object. With the development of Complementary Metal-Oxide Semiconductor (CMOS) technology, CMOS image sensors using CMOS are widely used.

Recently, as image processing devices are mounted on various devices, image processing devices that improve the characteristics of signal-to-noise ratio (SNR) at low and high illumination may be desirable. A pixel array of the image processing device may be very vulnerable to row noise (i.e., horizontal noise) caused by temporary noise generated at a corresponding time point by simultaneously reading out and outputting pixels of the same row.

An image sensor and an electronic device (e.g., imaging processing device) including the same in which row noise is improved and image data with improved signal-to-noise ratio is generated by controlling when pixel signals are read out of a pixel array through a row driver is disclosed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made.

What is claimed is:

1. An image sensor comprising:

a pixel array including a plurality of pixels arranged in a plurality of rows and a plurality of columns;

a row driver configured to transmit control signals to the pixel array; and an analog-to-digital converter array configured to receive pixel signals from the pixel array and convert the pixel signals into digital signals, wherein the row driver is configured to:

transmit a first control signal such that a first pixel group arranged in a first row from among the plurality of rows and a second pixel group arranged in a second row from among the plurality of rows output pixel signals during a first period during which a third pixel group arranged in the first row and a fourth pixel group arranged in the second row do not output pixel signals, and transmit a second control signal such that the third pixel group arranged in the first row and the fourth pixel group arranged in the second row output pixel signals during a second period during which the first pixel group arranged in the first row and the second pixel group arranged in the second row do not output pixel signals, wherein the first row and the second row are directly adjacent to each other.

2. The image sensor as claimed in claim 1, wherein a selection signal received from the row driver is a signal indicating selected pixel groups from which to output a pixel signal during one period from among a plurality of pixel groups included in the pixel array.

3. The image sensor as claimed in claim 2, wherein a transmission signal received from the row driver is a signal indicating a photodiode from which to output a pixel signal during the one period from among a plurality of photodiodes included in the selected pixel groups.

4. The image sensor as claimed in claim 3, wherein the row driver is configured to:

transmit a first selection signal to the first pixel group of the first row and the second pixel group of the second row during the first period to select both the first pixel group of the first row and the second pixel group of the second row with the first selection signal, and transmit a second selection signal to the third pixel group of the first row and the fourth pixel group of the second row during the second period to select both the third pixel group of the first row and the fourth pixel group of the second row with the second selection signal.

5. The image sensor as claimed in claim 4, wherein the row driver is configured to:

transmit a first transmission signal to the first pixel group of the first row and the second pixel group of the second row during the first period, and transmit a second transmission signal to the third pixel group of the first row and the fourth pixel group of the second row during the second period.

6. The image sensor as claimed in claim 3, wherein:

a pixel included in the plurality of pixel groups includes first to fourth photodiodes, and the pixel is configured to output a pixel signal according to a photocharge generated by a photodiode in which the transmission signal is received from among the first to fourth photodiodes during the one period.

7. The image sensor as claimed in claim 1, wherein:

the first pixel group and the third pixel group each include two pixels directly adjacent to each other in the first row such that the row driver is configured to cause the two pixels of the first pixel group to be output during the first period and to cause the two pixels of the third pixel group to be output during the second period, and the second pixel group and the fourth pixel group each include two pixels directly adjacent to each other in the second row such that the row driver is configured to cause the two pixels of the second pixel group to be output during the first period and to cause the two pixels of the fourth pixel group to be output during the second period.

8. The image sensor as claimed in claim 1, wherein the plurality of pixels included in the pixel array are arranged in a Bayer pattern.

9. An operation method of an image sensor, the method comprising:

outputting pixel signals by a first pixel group arranged in a first row and a second pixel group arranged in a second row, from among a plurality of rows included in a pixel array of the image sensor, during a first period without outputting pixel signals by a third pixel group arranged in the first row or a fourth pixel group arranged in the second row during the first period; and outputting pixel signals by the third pixel group arranged in the first row and the fourth pixel group arranged in the second row during a second period without outputting pixel signals by the first pixel group arranged in the first row or the second pixel group arranged in the second row during the second period, wherein the first row and the second row are directly adjacent to each other.

10. The operation method of an image sensor as claimed in claim 9, wherein a selection signal received from a row driver is a signal indicating selected pixel groups to output a pixel signal during one period from among a plurality of pixel groups included in the pixel array.

11. The operation method of an image sensor as claimed in claim 10, wherein a transmission signal received from the row driver is a signal indicating a photodiode to output a pixel signal during the one period from among a plurality of photodiodes included in the selection pixel groups.

12. The operation method of an image sensor as claimed in claim 11, further comprising:

transmitting a first selection signal to the first pixel group of the first row and the second pixel group of the second row during the first period, and transmitting a second selection signal to the third pixel group of the first row and the fourth pixel group of the second row during the second period.

13. The operation method of an image sensor as claimed in claim 12, further comprising:

transmitting a first transmission signal to the first pixel group of the first row and the second pixel group of the second row during the first period, and transmitting a second transmission signal to the third pixel group of the first row and the fourth pixel group of the second row during the second period.

14. The operation method of an image sensor as claimed in claim 11, wherein:

a pixel included in the plurality of pixel groups includes first to fourth photodiodes, and the outputting of the pixel signal includes outputting a pixel signal according to a photocharge generated by the photodiode in which the transmission signal is received from among the first to fourth photodiodes of the pixel during the one period.

15. The operation method of an image sensor as claimed in claim 9, wherein:

the first pixel group and the third pixel group each include two pixels directly adjacent to each other in the first row and for each of the first pixel group and the third pixel group, outputting the pixel signals includes outputting the two pixels directly adjacent to each other, and the second pixel group and the fourth pixel group each include two pixels directly adjacent to each other in the second row and for each of the second pixel group and the fourth pixel group, outputting the pixel signals includes outputting the two pixels directly adjacent to each other.

16. The operation method of an image sensor as claimed in claim 9, wherein a plurality of pixels included in the pixel array are arranged in a Bayer pattern.

17. An image sensor comprising:

a pixel array including a plurality of pixels arranged in a plurality of rows and a plurality of columns;

a row driver configured to transmit control signals to the pixel array; and an analog-to-digital converter array configured to receive pixel signals from the pixel array and convert the pixel signals into a digital signal, wherein the row driver is configured to transmit a first control signal to two pixel groups to output pixel signals of the two pixel groups of the pixel array during one readout period, and a first pixel group of the two pixel groups includes pixels in a first rows of the pixel array and a second pixel group of the two pixel groups includes pixels in a second row of the pixel array, the first row directly adjacent to the second row, and the pixels of the first pixel group include at least two pixels directly adjacent to each other within the first row and the pixels of the second pixel group include at least two pixels directly adjacent to each other within the second row.

\* \* \* \* \*